US008782210B2

(12) United States Patent
Akazawa et al.

(10) Patent No.: US 8,782,210 B2
(45) Date of Patent: Jul. 15, 2014

(54) NETWORK MANAGEMENT CONTROL PROGRAM, NETWORK MANAGEMENT CONTROL DEVICE, AND NETWORK MANAGEMENT CONTROL METHOD

(75) Inventors: Fumiaki Akazawa, Fukuoka (JP); Hideki Matsuda, Fukuoka (JP); Shingo Hiyama, Fukuoka (JP);

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 12/929,924

(22) Filed: Feb. 24, 2011

(65) Prior Publication Data
US 2011/0231543 A1 Sep. 22, 2011

(30) Foreign Application Priority Data
Mar. 19, 2010 (JP) ................................ 2010-064527

(51) Int. Cl.
*G06F 15/173* (2006.01)
(52) U.S. Cl.
USPC .......................................................... 709/224
(58) Field of Classification Search
USPC .......................................................... 709/224
See application file for complete search history.

(56) References Cited

U.S. PATENT DOCUMENTS

| 6,741,610 B1* | 5/2004 | Volftsun et al. ................ 370/466 |
| 7,233,978 B2* | 6/2007 | Overton et al. ................ 709/217 |
| 8,442,030 B2  | 5/2013 | Dennison |

FOREIGN PATENT DOCUMENTS

| JP | 2003-152812 | 5/2003 |
| JP | 2003-188906 | 7/2003 |
| JP | 2006-025159 | 1/2006 |
| JP | 2010-520663 | 6/2010 |

OTHER PUBLICATIONS

Japanese Office Action issued Sep. 10, 2013 for corresponding Japanese Application No. 2010-064527.

* cited by examiner

*Primary Examiner* — Phuoc Nguyen
*Assistant Examiner* — Davoud Zand
(74) *Attorney, Agent, or Firm* — Staas & Halsey LLP

(57) ABSTRACT

A network management control device includes a link information storing unit that stores information about connections between nodes belonging to respective networks that are controlled by different protocols. The network management control device receives an input of the configuration information about each of the networks. The network management control device then generates combined information between different protocols, based on the information stored in the link information storing unit about connections between nodes and the received network configuration information. After that, the network management control device performs provisioning in accordance with the generated combined information between the different protocols.

12 Claims, 26 Drawing Sheets

FIG.3

| MODEL | NODE NAME |
|---|---|
| MODEL A | NODE A1 |
| MODEL A | NODE A2 |
| MODEL A | NODE A3 |
| MODEL B | NODE B1 |
| MODEL B | NODE B2 |
| MODEL B | NODE C |
| ... | ... |

FIG.4

| START-POINT NODE | START-POINT I/F | END-POINT NODE | END-POINT I/F |
|---|---|---|---|
| NODE A1 | port 1 | NODE B1 | port 1 |
| NODE A1 | port 2 | NODE A2 | port 3 |
| NODE A2 | port 4 | NODE A3 | port 5 |
| ... | ... | ... | ... |

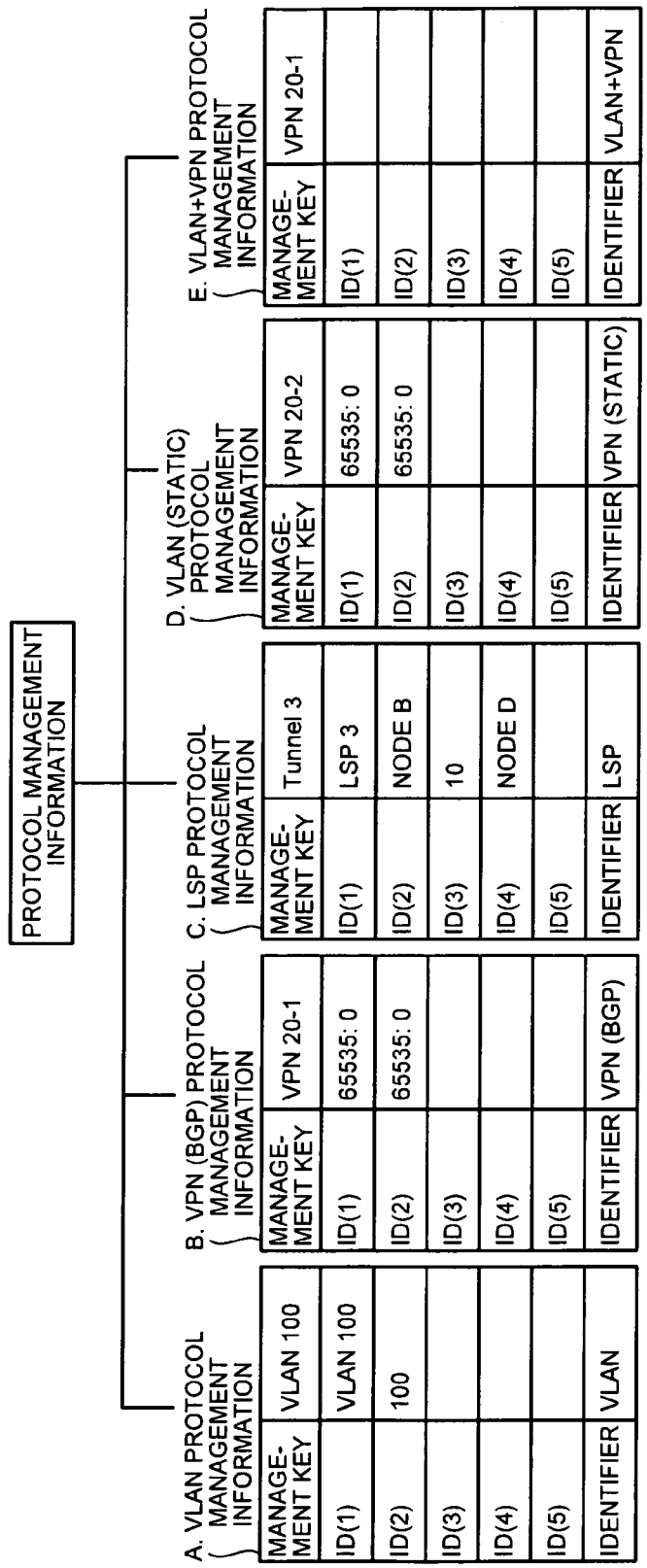

FIG.7

PROTOCOL CONFIGURATION INFORMATION ((A) OF FIG. 6)

A-1

| MANAGEMENT KEY | VLAN 100 |
|---|---|
| No. (ORDER) | 1 |
| MODEL | MODEL A |
| ADDRESS | NODE A1 |
| INTERFACE | port 1 |
| ID(1) | |
| ID(2) | |
| ID(3) | |
| ID(4) | |

A-2

| MANAGEMENT KEY | VLAN 100 |
|---|---|
| No. (ORDER) | 2 |
| MODEL | MODEL A |
| ADDRESS | NODE A1 |
| INTERFACE | port 2 |
| ID(1) | |
| ID(2) | |
| ID(3) | |
| ID(4) | |

A-3

| MANAGEMENT KEY | VLAN 100 |
|---|---|
| No. (ORDER) | 3 |
| MODEL | MODEL A |
| ADDRESS | NODE A2 |
| INTERFACE | port 3 |
| ID(1) | |
| ID(2) | |
| ID(3) | |
| ID(4) | |

A-4

| MANAGEMENT KEY | VLAN 100 |
|---|---|
| No. (ORDER) | 4 |
| MODEL | MODEL A |
| ADDRESS | NODE A2 |
| INTERFACE | port 4 |
| ID(1) | |
| ID(2) | |
| ID(3) | |
| ID(4) | |

A-5

| MANAGEMENT KEY | VLAN 100 |
|---|---|
| No. (ORDER) | 5 |
| MODEL | MODEL A |
| ADDRESS | NODE A3 |
| INTERFACE | port 5 |
| ID(1) | |
| ID(2) | |
| ID(3) | |
| ID(4) | |

FIG.8

PROTOCOL CONFIGURATION
INFORMATION ((B) OF FIG. 6)

B-1

| MANAGEMENT KEY | VPN 20-1 |
|---|---|
| No. (ORDER) | 1 |
| MODEL | MODEL B |
| ADDRESS | NODE B1 |
| INTERFACE | port 1 |
| ID(1) | 1.1.1.1 |
| ID(2) | 1 |
| ID(3) | bgp 1 |
| ID(4) | |

B-2

| MANAGEMENT KEY | VPN 20-1 |
|---|---|
| No. (ORDER) | 2 |
| MODEL | MODEL B |
| ADDRESS | NODE B2 |
| INTERFACE | port 1 |
| ID(1) | 1.1.2.2 |
| ID(2) | 1 |
| ID(3) | bgp 1 |
| ID(4) | |

FIG.9

PROTOCOL CONFIGURATION INFORMATION ((C) OF FIG. 6)

C-1

| MANAGEMENT KEY | Tunnel 3 |
|---|---|
| No. (ORDER) | 1 |
| MODEL | MODEL B |
| ADDRESS | NODE B2 |
| INTERFACE | |
| ID(1) | 2.2.2.2 |
| ID(2) | |
| ID(3) | |
| ID(4) | |

C-2

| MANAGEMENT KEY | Tunnel 3 |
|---|---|
| No. (ORDER) | 2 |
| MODEL | MODEL B |
| ADDRESS | NODE B2 |
| INTERFACE | |
| ID(1) | 2.2.3.3 |
| ID(2) | |
| ID(3) | |
| ID(4) | |

C-3

| MANAGEMENT KEY | Tunnel 3 |
|---|---|
| No. (ORDER) | 3 |
| MODEL | MODEL B |
| ADDRESS | NODE B2 |
| INTERFACE | |
| ID(1) | 2.2.4.4 |
| ID(2) | |
| ID(3) | |
| ID(4) | |

FIG.10

PROTOCOL CONFIGURATION INFORMATION ((D) OF FIG. 6)

D-1

| MANAGEMENT KEY | VPN 20-2 |
|---|---|
| No. (ORDER) | 1 |
| MODEL | MODEL D |
| ADDRESS | NODE D |
| INTERFACE | port 1 |
| ID(1) | 6.6.6.0 |
| ID(2) | ff.ff.ff.0 |
| ID(3) | 1.1.1.1 |
| ID(4) | |

FIG.11

PROTOCOL CONFIGURATION INFORMATION ((E) OF FIG. 6)

E-1

| MANAGEMENT KEY | VPN 20-1 |
|---|---|
| No. (ORDER) | 1 |
| MODEL | MODEL B |
| ADDRESS | NODE B1 |
| INTERFACE | port 1 |
| ID(1) | 100 |
| ID(2) | 1.1.1.1 |
| ID(3) | |
| ID(4) | |

FIG.14

| MODEL | MODEL A |
|---|---|
| VLAN NAME | VLAN 100 |
| VLAN-ID | 100 |
| DEVICE | NODE A |
| INTERFACE | port 1 |

FIG.15

| MODEL | MODEL B |
|---|---|
| VLAN NAME | VPN 20-1 |
| RD VALUE | 65535:0 |
| RT VALUE | 65535:0 |
| DEVICE | NODE B |
| INTERFACE | port 1 |
| CE-WAN | 1.1.1.1 |
| AS NUMBER | 1 |
| MAP NAME | bgp 1 |

FIG.16

| MODEL | MODEL B |
|---|---|
| LSP NAME | LSP 3 |
| TUNNEL NAME | Tunnel 3 |
| PE ADDRESS START | NODE B |
| PRIORITY | 10 |
| HOP ADDRESS | 2.2.2.2 |
| HOP ADDRESS | 2.2.3.3 |
| HOP ADDRESS | 2.2.4.4 |
| PE ADDRESS END | NODE D |

FIG.17

| MODEL | MODEL D |
|---|---|
| VRF NAME | VPN 20-2 |
| RD VALUE | 65535:0 |
| RT VALUE | 65535:0 |
| DEVICE | NODE D |
| INTERFACE | port 1 |
| NW ADDRESS | 6.6.6.0 |
| NW MASK | ff.ff.ff.0 |
| HOP ADDRESS | 1.1.1.1 |

NETWORK MANAGEMENT CONTROL PROGRAM, NETWORK MANAGEMENT CONTROL DEVICE, AND NETWORK MANAGEMENT CONTROL METHOD

CROSS-REFERENCE TO RELATED APPLICATION

This application is based upon and claims the benefit of priority of the prior Japanese Patent Application No. 2010-064527, filed on Mar. 19, 2010, the entire contents of which are incorporated herein by reference.

FIELD

The embodiments discussed herein are directed to a network management control program, a network management control device, and a network management control method.

BACKGROUND

Conventionally, networks controlled by various protocols such as Virtual Local Area Network (VLAN), Virtual Private Network (VPN), and Label Switched Path (LSP) have been used. For example, the headquarters of a company A and the branch offices of the company A are connected via a VLAN, a VPN, and an LSP. In this manner, corporate networks each involving two or more networks controlled by different protocols are used.

Meanwhile, managers perform provisioning, which is the config settings control for updating software and changing, adding, or deleting network configuration information, on network devices such as routers and switches used in respective networks. An example case where provisioning is performed on a network including a VLAN network NW1, a VPN network NW2, and an LSP network NW3 is now described.

This network includes a network management device that is connected to a manager terminal operated by a manager or the like and the network devices of the respective networks. The network management device includes a VLAN information DB, a VPN information DB, and an LSP information DB. The VLAN information DB stores VLAN information that is set in the respective devices in the network NW1, the VPN information DB stores VPN information that is set in the respective devices in the network NW2, and the LSP information DB stores LSP information that is set in the respective devices in the network NW3.

Upon receipt of VLAN change information that indicates a change to the settings in the VLAN from the manager or the like, the manager terminal transmits a provisioning request containing the VLAN change information to the network management device. The network management device then refers to the VLAN information DB to identify the network device of the network NW1 to be subjected to a VLAN change. The network management device issues a VLAN setting command to the identified network device, and changes the settings.

Likewise, upon receipt of VPN change information that indicates a change to the settings in the VPN from the manager or the like, the manager terminal transmits a provisioning request containing the VPN change information to the network management device. The network management device then refers to the VPN information DB to identify the network device of the network NW2 to be subjected to a VPN change. The network management device issues a VPN setting command to the identified network device, and changes the settings.

Likewise, upon receipt of LSP change information that indicates a change to the settings in the LSP from the manager or the like, the manager terminal transmits a provisioning request containing the LSP change information to the network management device. The network management device then refers to the LSP information DB to identify the network device of the network NW3 to be subjected to an LSP change. The network management device issues an LSP setting command to the identified network device, and changes the settings.

Patent Document 1: Japanese Laid-open Patent Publication No. 2006-25159

By the conventional technique, however, provisioning for combining different protocols may not be automatically performed.

In the above described example having networks controlled by different protocols, the network management device manages and stores the VLAN information about the network NW1, the VPN information about the network NW2, and the LSP information about the network NW3, independently of one another. That is, the network management device manages the network configuration information for each protocol. When it receives a provisioning request for a combination of the network NW1 and the network NW2, the network management device may not automatically identify and control subject nodes, and may not determine which information of the VLAN information and which information of the VPN information may be combined.

Therefore, after performing provisioning on each protocol with the use of the network management device, the manager or the like needs to manually input a command for provisioning for combining protocols to the network management device and network devices to be combined.

SUMMARY

According to an aspect of an embodiment of the invention, a computer-readable, non-transitory mediums storing therein a program for network management control causing a computer to execute a process including receiving an input of configuration information about each network in a plurality of networks that are controlled by different protocols; generating combined information between the different protocols, based on information about a connection between nodes stored in a link information storing unit that stores the information about a connection between nodes belonging to the respective networks, and the network configuration information in the plurality of networks; and performing provisioning in accordance with the combined information between the different protocols.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of the information stored in the node information DB;

FIG. 4 is a diagram illustrating an example of the information stored in the link information DB;

FIG. 6 is a diagram illustrating an example of the information stored in the protocol management information DB;

FIG. 7 is a diagram illustrating an example of the information about the VLAN stored in the protocol configuration information DB;

FIG. 8 is a diagram illustrating an example of the information about the VPN(BGP) stored in the protocol configuration information DB;

FIG. 9 is a diagram illustrating an example of the information about the LSP stored in the protocol configuration information DB;

FIG. 10 is a diagram illustrating an example of the information about the VLAN(Static) stored in the protocol configuration information DB;

FIG. 11 is a diagram illustrating an example of the information about the VLAN+VPN stored in the protocol configuration information DB;

FIG. 14 is a diagram illustrating an example of the VLAN settings information received from the management terminal;

FIG. 15 is a diagram illustrating an example of the VPN (BGP) settings information received from the management terminal;

FIG. 16 is a diagram illustrating an example of the LSP settings information received from the management terminal;

FIG. 17 is a diagram illustrating an example of the VPN (Static) settings information received from the management terminal;

DESCRIPTION OF EMBODIMENTS

Preferred embodiments of the present invention will be explained with reference to accompanying drawings. It may be noted that the present invention is not limited to these embodiments.

[a] First Embodiment

Figure 1:
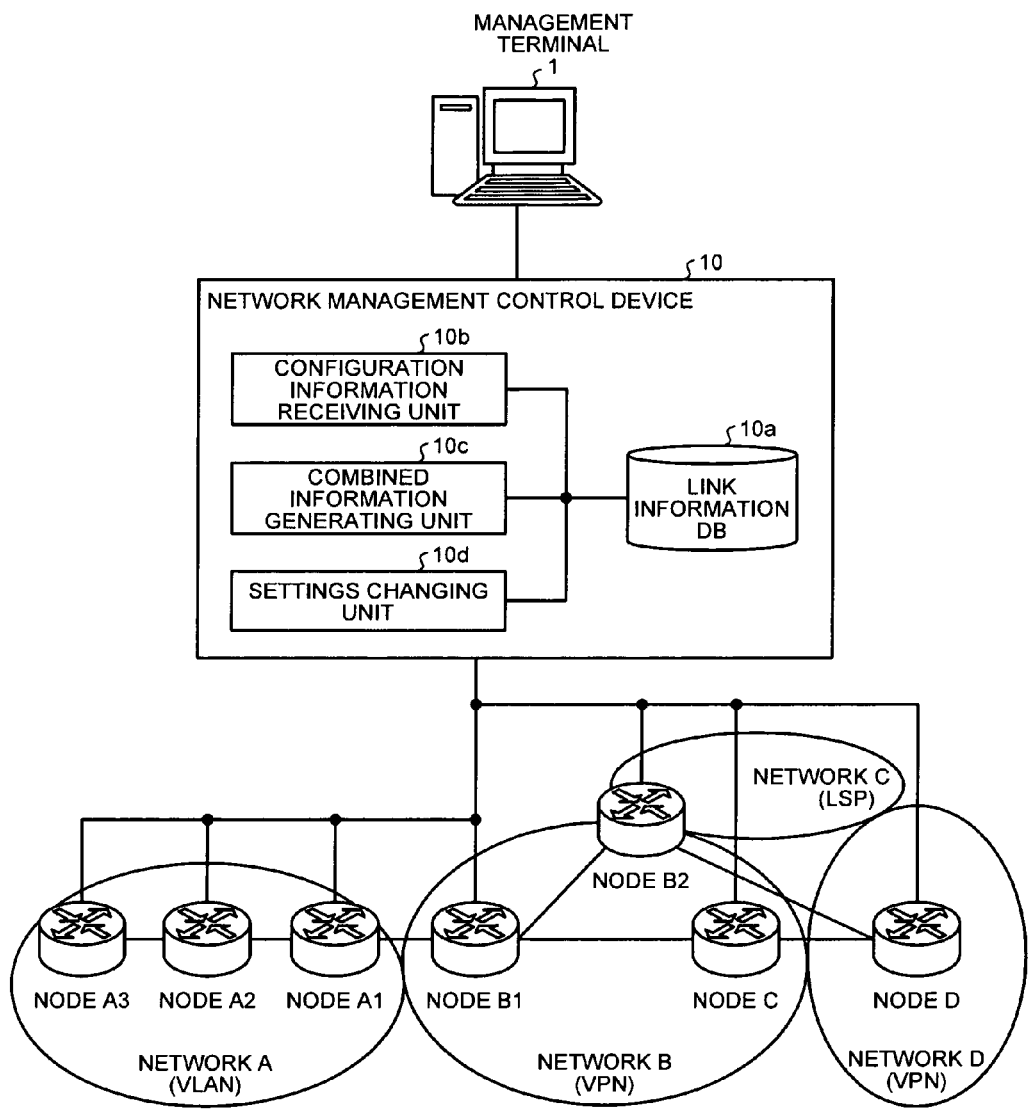
FIG. 1 is a diagram illustrating the entire structure of a network according a first embodiment.

FIG. 1 is a diagram illustrating the entire structure of a network according to a first embodiment. The IP (Internet Protocol) network illustrated in FIG. 1 is a network that integrates networks controlled by different protocols, and includes a network A, a network B, a network C, a network D, a management terminal 1, and a network management control device 10, for example. The number of networks and the like illustrated in FIG. 1 are merely examples, and do not limit the invention.

The network A includes a node A1, a node A2, and a node A3, and is controlled by a Virtual Local Area Network (VLAN). The network B includes a node B1, a node B2, and a node C, and is controlled by a Virtual Private Network (VPN) compliant with Border Gateway Protocol (BGP). The network C includes a node B2 located on the boundary with the network B, and is controlled by Label Switched Path (LSP). The network D includes a node D, and is controlled by a conventional VPN such as an IP-VPN.

Each of the nodes belonging to the respective networks stores the protocol management information to be used in each corresponding network. For example, the node A1, the node A2, and the node A3 store the information about the VLAN, such as "VLAN-ID" for uniquely identifying the VLAN, "set device" indicating the device to which the VLAN is connected, and "interface" indicating the port in which the VLAN is set.

The node B1, the node B2, and the node C stores VPN (BGP) information, such as "RD value" or "RT value" for uniquely identifying the VPN, "interface" indicating the port connected to the VPN, and "routing ID" specifying a routing path.

The node B2 also stores LSP information, such as "tunnel name" indicating a tunnel LSP as the communication path of the LSP, "PE address" that indicates a tunnel-connected network device or the like and is used by the PE, "priority" indicating the order of priority in LSP path selection. The node D stores "RD value", "interface", "routing ID", and the like, like the node B1.

The nodes of the respective networks represent network devices such as switching hubs, L2 switches, L3 switches, and routers. Alternatively, each of the nodes may not be a network device, but may be a computer that has the same functions as those of network devices, such as a routing function and a switching function. Also, the number of nodes included in the respective networks illustrated in FIG. 1 is merely examples, and do not limit the invention.

The management terminal 1 is a computer that is connected to the network management control device 10, and receives various operations from a manager or the like. For example, the management terminal 1 receives an input of a provisioning start instruction via a mouse or a keyboard, and transmits the provisioning start instruction to the network management control device 10. The management terminal 1 also outputs settings screens of respective protocols to a display unit such as a display device, and transmits the settings information about the respective protocols that are input to the settings screens through the mouse or keyboard or the like, to the network management control device 10.

The network management control device 10 is a server device that is connected to the respective nodes included in the network A, the network B, the network C, and the network D, as well as to the management terminal 1, and performs provisioning on the respective nodes. For example, the network management control device 10 includes a link information DB 10a, a configuration information receiving unit 10b, a combined information generating unit 10c, and a settings changing unit 10d, and performs provisioning on the respective nodes, using those components.

In the networks controlled by different protocols, the link information DB 10a is a storage device such as a semiconductor memory element, a hard disk, or an optical disk that stores the information about the connections between the nodes belonging to the respective networks. The configuration information receiving unit 10b receives inputs of the configuration information from the management terminal 1 about each of the network A, the network B, the network C, and the network D. Based on the information about the connections between the nodes stored in the link information DB 10a and the network configuration information received by the configuration information receiving unit 10b, the combined information generating unit 10c generates combined information about the different protocols. In accordance with the combined information generated by the combined information generating unit 10c in the different protocols, the settings changing unit 10d performs provisioning. The network configuration information may be stored as a database.

As described above, according to the first embodiment, the network management control device 10 can perform a provisioning operation that combines protocols together, and accordingly, the manager does not need to manually input a command. Thus, the provisioning operation that combines different protocols together can be automatically performed.

[b] Second Embodiment

The network management control device 10 disclosed in this invention may have various functional units other than the functional units described in the first embodiment. Therefore, a second embodiment concerns an example of a network management control device having various functional units other than the functions described in the first embodiment.

Structure of Network Management Control Device

Figure 2:
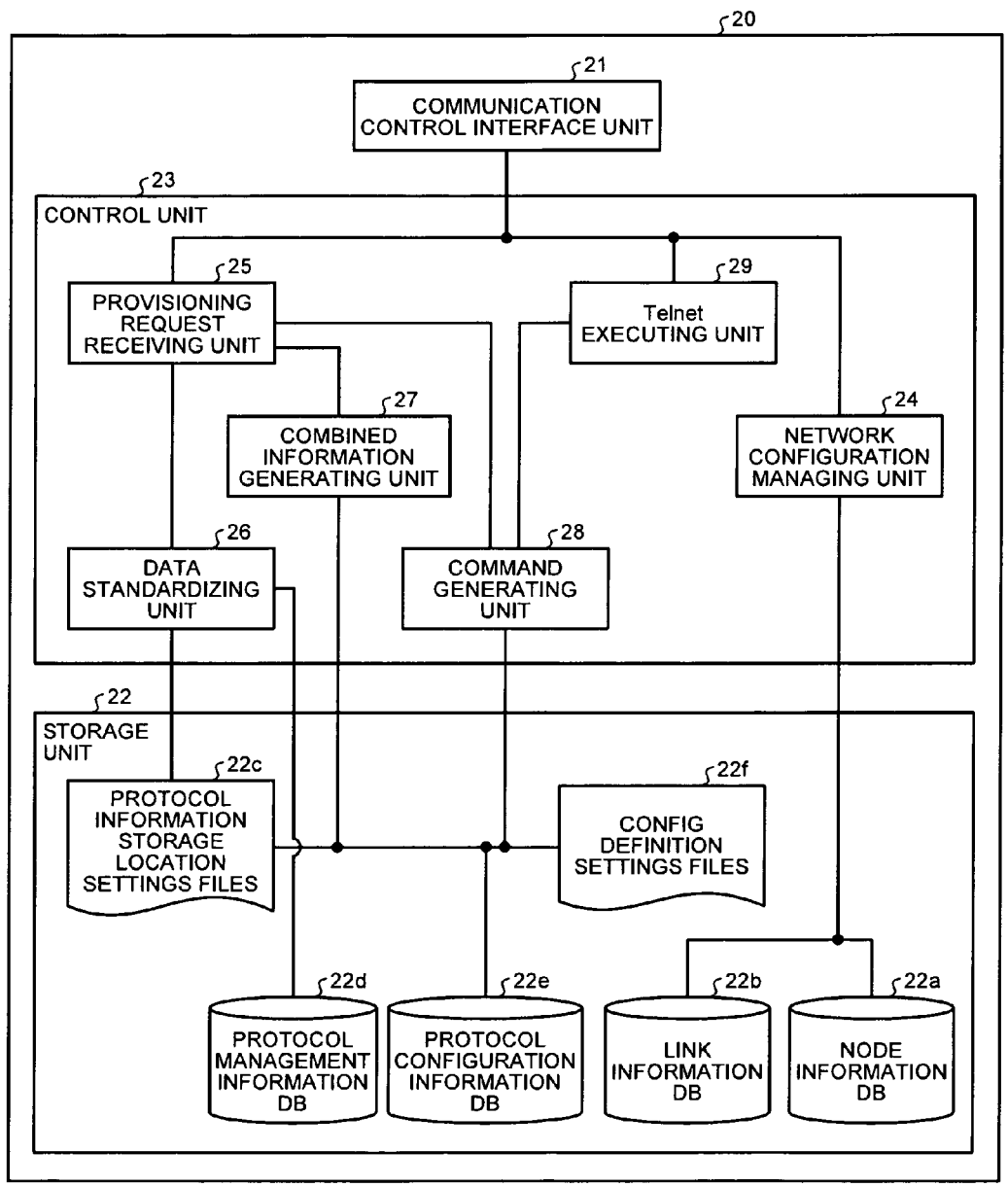
FIG. 2 is a block diagram illustrating the structure of a network management control device according to a second embodiment.

Referring first to FIG. 2, the structure of the network management control device according to the second embodiment is described. FIG. 2 is a block diagram illustrating the structure of the network management control device according to the second embodiment. As illustrated in FIG. 2, a network management control device 20 includes a communication control interface unit 21, a storage unit 22, and a control unit 23.

In the second embodiment, the structure of the network including the network management control device 20 is the same as that of FIG. 1. That is, the network according to the second embodiment includes the network A, the network B, the network C, the network D, the management terminal 1, and the network management control device 20. As in the first embodiment, each of the nodes belonging to the respective networks stores the management information about the protocol to be used in each corresponding network.

It may be noted that the network management control device 20 is not limited to the functional units illustrated in FIG. 2, and may have other various functional units such as an input unit and a display unit. For example, an input unit may be a keyboard and mouse that receive various instructions from the manager or the like, and outputs the received information to the control unit 23. The display unit may be a monitor, a display, a touch panel, or a speaker, for example, and cooperates with the input unit to realize a pointing device function.

The communication control interface unit 21 is an interface such as a communication port that controls communications with other devices. For example, the communication control interface unit 21 receives a provisioning start instruction and individual protocol settings information from the management terminal 1, and outputs the instruction and information to a provisioning request receiving unit 25. The communication control interface unit 21 transmits a command issued from a Telnet executing unit 29 to the corresponding node. The communication control interface unit 21 also receives the execution results of the transmitted command, and transmits the results to the Telnet executing unit 29.

The storage unit 22 is a storage device such as a semiconductor memory element, a hard disk, or an optical disk, and stores data and programs used for various operations to be performed by the control unit 23. The storage unit 22 includes a node information DB 22a, a link information DB 22b, protocol information storage location settings files 22c, a protocol management information DB 22d, a protocol configuration information DB 22e, and config definition settings files 22f.

The node information DB 22a stores the information about the nodes belonging to the respective networks. For example, the node information DB 22a stores "model, node name" such as "model A, node A1", "model A, node A2", "model B, node B1", and "model B, node C", as illustrated in FIG. 3. FIG. 3 is a diagram illustrating an example of the information stored in the node information DB.

The "model" stored in the node information DB 22a is the information that specifies manufacturers and types of network devices. For example, the model A and the model B indicate different manufacturers, and different kinds of network devices, one being a router and the other being a switch, for example. That is, the model A and the model B have different config settings files, and different commands for performing provisioning. In the case illustrated as an example in FIG. 3, the node A1, the node A2, and the node A3 are network devices of the same model, which is the model A, and the node B1, the node B2, and the node C are network devices of the same model, which is the model B.

The link information DB 22b stores the information about connections between the nodes belonging to the respective networks controlled by different protocols. In other words, the link information DB 22b stores the link information indicating the connection relationships between the nodes. For example, the link information DB 22b stores "start-point node, start-point I/F, end-point node, end-point I/F" such as "node A1, port 1, node B1, port 1" and "node A1, port 2, node A2, port 3", as illustrated in FIG. 4. FIG. 4 is a diagram illustrating an example of the information stored in the link information DB.

Each "start-point node" stored in the link information DB 22b indicates a node serving as the start point of a link, and each "start-point I/F" indicates the port number of a node serving as the start-point of a link. Also, each "end-point node" indicates a node serving as the end point of a link, and each "end-point I/F" indicates the port number of a node serving as the end-point of a link. In the case illustrated as an example in FIG. 4, there is a link from port 1 of the node A1 to port 1 of the node B1, and there is a link from port 2 of the node A1 to port 3 of the node A2. Also, there is a link from port 4 of the node A2 to port 5 of the node A3.

Figure 5:
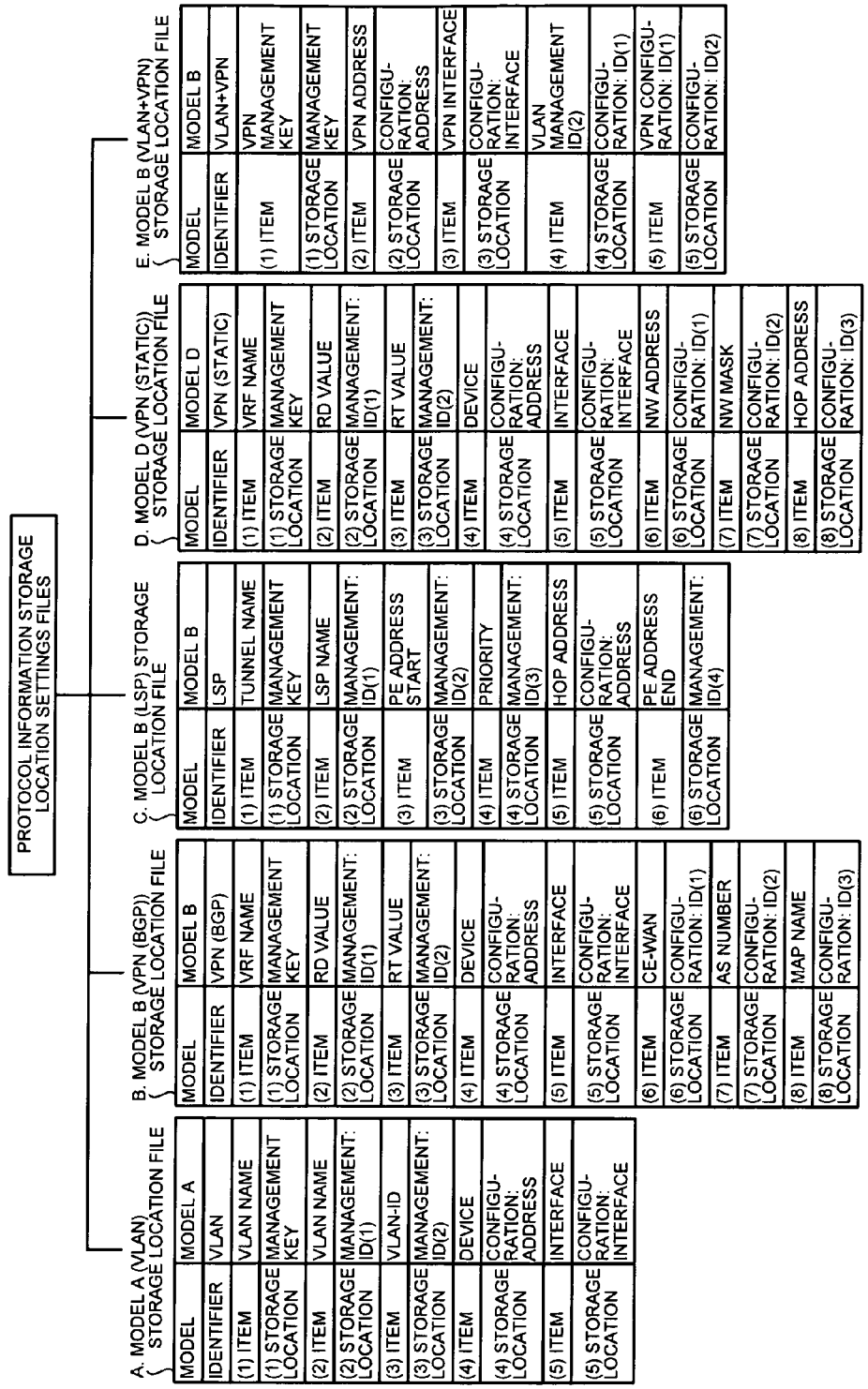
FIG. 5 is a diagram illustrating an example of the information stored in the protocol information storage location settings files.

The protocol information storage locating settings files 22*c* stores storage location information that defines storage destinations in cases where information is stored in the protocol management information DB 22*d* or the protocol configuration information DB 22*e*. For example, the protocol information storage location settings files 22*c* store: (A) model A (VLAN) storage location file, (B) model B (VPN(BGP)) storage location file, and (C) model B (LSP) storage location file, as illustrated in FIG. 5. The protocol information storage location settings files 22*c* also store: (D) model D (VPN (Static)) storage location file and (E) model B (VLAN+VPN) storage location file. FIG. 5 is a diagram illustrating an example of the information stored in the protocol information storage location settings files.

The (A) model A (VLAN) storage location file is a file that defines the storage locations at which the information about the network devices of the model A in the network controlled by a VLAN is stored. The (A) model A (VLAN) storage location file stores "model, identifier, (1) item, (1) storage location, (2) item, (2) storage location, (3) item, (3) storage location, (4) item, (4) storage location, (5) item, (5) storage location", as illustrated in FIG. 5. For example, the (A) model A (VLAN) storage location file stores "model A, VLAN, VLAN name, management key, VLAN name, management: ID(1), VLAN-ID, management: ID(2), device, configuration: address, interface, configuration: interface".

That is, the "VLAN name" as the name of the VLAN is stored at the location of the "management key" in the protocol management information DB 22*d* and the location of "ID(1)" in the protocol management information DB 22*d*. The "VLAN-ID" for identifying the VLAN is stored at the location of "ID(2)" in the protocol management information DB 22*d*. The "device" specifying the network device is stored at the location of the "address" in the protocol configuration information DB 22*e*, and the "interface", which is the number of the port being used, is stored at the location of the "interface" in the protocol configuration information DB 22*e*.

The (B) model B (VPN(BGP)) storage location file is a file that defines the storage locations at which the information about the network devices of the model B in the network controlled by a VPN using a BGP is stored. The (B) model B (VPN(BGP)) storage location file stores "model, identifier, (1) item, (1) storage location, . . . , (8) item, (8) storage location", as illustrated in FIG. 5. For example, the (B) model B (VPN(BGP)) storage location file stores "model B, VPN (BGP), VRF (Virtual Routing and Forwarding) name, management key, RD value, management: ID(1), RT value, management: ID(2)", as illustrated in FIG. 5. The (B) model B (VPN(BGP)) storage location file further stores "device, configuration: address, interface, configuration: interface". The (B) model B (VPN(BGP)) storage location file further stores "CE-WAN (Customer Edge-Wide Area Network), configuration: ID(1), AS (Autonomous System) number, configuration: ID(2), map name, configuration: ID(3)", and the like.

That is, the "VRF name" for identifying the virtual routing is stored at the location of the "management key" in the protocol management information DB 22*d*, and the "RD value" for uniquely identifying the VPN is stored at the location of "ID(1)" in the protocol management information DB 22*d*. The "RT value" for uniquely identifying the VPN is stored at the location of "ID(2)" in the protocol management information DB 22*d*. The "device" is stored at the location of the "address" in the protocol configuration information DB 22*e*, and the "interface" is stored at the location of the "interface" in the protocol configuration information DB 22*e*. The "CE-WAN" for identifying the WAN using a CE router is stored at the location of "ID(1)" in the protocol configuration information DB 22*e*. The "AS number" for identifying the independent network held and operated by each organization is stored at the location of "ID(2)" in the protocol configuration information DB 22*e*. The "map name" for identifying the route map as the path control by the BGP is stored at the location of "ID(3)" in the protocol configuration information DB 22*e*.

The (C) model B (LSP) storage location file is a file that defines storage locations at which the information about the network devices of the model B in the network controlled by an LSP is stored. The (C) model B (LSP) storage location file stores "model, identifier, (1) item, (1) storage location, . . . , (6) item, (6) storage location", as illustrated in FIG. 5. For example, the (C) model B (LSP) storage location file stores "model B, LSP, tunnel name, management key, LSP name, management: ID(1), PE address start, management: ID(2), priority, management: ID(3)", as illustrated in FIG. 5. The (C) model B (LSP) storage location file further stores "hop address, configuration: address, PE address end, management: ID(4)", and the like.

That is, the "tunnel name" as the name of the LSP tunnel, is stored at the location of the "management key" in the protocol management information DB 22*d*, and the "LSP name" for uniquely identifying the LSP is stored at the location of "ID(1)" in the protocol management information DB 22*d*. The "PE address start" indicating the start-point node of the LSP is stored at the location of the "ID(2)" in the protocol management information DB 22*d*, and the "priority" indicating the order of priority in the LSP path selection is stored at the location of "ID(3)" in the protocol management information DB 22*d*. The "hop address" indicating the node that hops from the start-point node to the end-point node is stored at the location of the "address" in the protocol configuration information DB 22*e*. The "PE address end" indicating the end-point node of the LSP is stored at the location of "ID(4)" in the protocol management information DB 22*d*.

The (D) model B (VPN(Static)) storage location file is a file that defines storage locations at which the information about the network devices of the model B in the network controlled by a conventional VPN is stored. The (D) model B (VPN (Static)) storage location file stores "model, identifier, (1) item, (1) storage location, . . . , (8) item, (8) storage location", as illustrated in FIG. 5. For example, the (D) model B (VPN (Static)) storage location file stores "model D, VLAN(Static), VRF name, management key, RD value, management: ID(1), RT value, management: ID(2)". The (D) model B (VPN (Static)) storage location file further stores "device, configuration: address, interface, configuration: interface, NW address, configuration: ID(1), NW mask, configuration: ID(2), hop address, configuration: ID(3)", and the like.

That is, the "VLAN name" is stored at the location of the "management key" in the protocol management information DB 22*d*, and the "RD value" is stored at the location of "ID(1)" in the protocol management information DB 22*d*. The "RT value" is stored at the location of "ID(2)" in the protocol management information DB 22*d*. The "device" is stored at the location of the "address" in the protocol configuration information DB 22*e*, and the "interface" is stored at the location of the "interface" in the protocol configuration information DB 22*e*. Further, the "NW address", which is the network address, is stored at the location of "ID(1)" in the protocol configuration information DB 22*e*. The "NW mask", which is the network mask, is stored at the location of "ID(2)" in the protocol configuration information DB 22*e*, and the "hop address" is stored at the location of "ID(3)" in the protocol configuration information DB 22*e*.

The (E) model B (VLAN+VPN) storage location file is a file that defines storage locations at which the information about the network device of the model B that combines a VLAN network with a VPN network is stored. The (E) model B (VLAN+VPN) storage location file stores "model, identifier, (1) item, (1) storage location, . . . , (5) item, (5) storage location", as illustrated in FIG. 5. For example, (E) model B (VLAN+VPN) storage location file stores "model B, VLAN+VPN, VPN management key, management key, VPN address, configuration: address, VPN interface, configuration: interface". The (E) model B (VLAN+VPN) storage location file further stores "VLAN management ID(2), configuration: ID(1), VPN configuration ID(1), configuration: ID(2)", and the like.

That is, the "VPN management key", which is associated with the VPN to be joined and is stored in the management key in the protocol management information DB 22*d*, is stored at the location of the "management key" in the protocol management information DB 22*d*. The "VPN address", which is associated with the VPN to be joined and is stored in the address in the protocol configuration information DB 22*e*, is stored at the location of the "address" in the protocol configuration information DB 22*e*.

The "VPN interface", which is associated with the VPN to be joined and is stored in the interface in the protocol configuration information DB 22*e*, is stored at the location of the "interface" in the protocol configuration information DB 22*e*. The "VLAN management ID(2)", which is associated with the VLAN to be joined and is stored in ID(2) in the protocol management information DB 22*d*, is stored at the location of "ID(1)" in the protocol configuration information DB 22*e*. The "VPN management ID(1)", which is associated with the VPN to be joined and is stored in ID(1) in the protocol management information DB 22*d*, is stored at the location of "ID(2)" in the protocol configuration information DB 22*e*.

The above described files are information that is set and stored beforehand by the manager or the like. Although the protocols used in the network illustrated in FIG. 1, such as a VPN and an LSP, are illustrated in FIG. 5, the present invention is not limited to them, and the information is stored for each protocol used in the networks managed by the network management control device 20. Also, the "VLAN" and the "VPN" as the subjects to be combined are combined in this example. However, the present invention is not limited to that, and any networks can be combined. In that case, a protocol information storage location file may be provided for each of the subjects to be combined.

Referring back to FIG. 2, the protocol management information DB 22*d* stores the protocol management information such as the protocol identifier, VLAN-ID, about the respective protocols and the provisioning for combining protocols. The protocol management information DB 22*d* holds a template including "management key, ID(1), ID(2), ID(3), ID(4), ID(5), identifier" for each protocol. The protocol management information DB 22*d* holds the information which a later described data standardizing unit 26 or a combined information generating unit 27 has stored into the template. That is, the data standardizing unit 26 or the combined information generating unit 27 extracts information from data received from the management terminal 1, and stores the information into the template, in accordance with the information stored in the protocol information storage location settings files 22*c*. The protocol management information DB 22*d* then holds the information stored in the templates as the information about the provisioning.

For example, the protocol management information DB 22*d* stores: (A) VLAN protocol management information, (B) VPN(BGP) protocol management information, and (C) LSP protocol management information, as illustrated in FIG. 6. The protocol management information DB 22*d* further stores: (D) VLAN(Static) protocol management information and (E) VLAN+VPN protocol management information. FIG. 6 is a diagram illustrating an example of the information stored in the protocol management information DB.

The (A) VLAN protocol management information has "VLAN 100, VLAN 100, 100, -, -, -, VLAN" as the "management key, ID(1), ID(2), ID(3), ID(4), ID(5), identifier". That is, the protocol management information DB 22*d* stores the VLAN information containing "VLAN 100" as the VLAN name and "100" as the VLAN-ID, with "VLAN 100" being the management key.

The (B) VPN(BGP) protocol management information has "VPN 20-1, 65535:0, 65535:0, -, -, -, VPN (BGP)" as the "management key, ID(1), ID(2), ID(3), ID(4), ID(5), identifier". That is, the protocol management information DB 22*d* stores the VPN information containing "65535:0" as the RD value and "65535:0" as the RT value, with "VPN 20-1" being the management key.

The (C) LSP protocol management information has "Tunnel 3, LSP 3, node B, 10, node D, -, LSP" as the "management key, ID(1), ID(2), ID(3), ID(4), ID(5), identifier". That is, the protocol management information DB 22*d* stores the LSP information containing "node B" as the start-point node, "node D" as the end-point node, "LSP 3" as the LSP name, and "10" as the order of priority, with "Tunnel 3" being the management key.

The (D) VLAN(Static) protocol management information has "VPN 20-2, 65535:0, 65535:0, -, -, -, VPN (Static)" as the "management key, ID(1), ID(2), ID(3), ID(4), ID(5), identifier". That is, the protocol management information DB 22*d* stores the VPN information containing "65535:0" as the RD value and "65535:0" as the RT value, with "VPN 20-2" being the management key.

The (E) VLAN+VPN protocol management information has "VPN 20-1, -, -, -, -, -, VLAN+VPN" as the "management key, ID(1), ID(2), ID(3), ID(4), ID(5), identifier". That is, the protocol management information DB 22*d* stores the combined information about the VLAN and the VPN, with "VPN 20-1" being the management key.

Here, the information (A) through (D) are the information generated and stored by the data standardizing unit 26, and the information (E) is the information generated and stored by the combined information generating unit 27. Therefore, the information (A) through (E) is empty databases before the data standardizing unit 26 or the combined information generating unit 27 stores information. FIG. 6 illustrates a situation where the data standardizing unit 26 and the combined information generating unit 27 have stored information.

Referring back to FIG. 2, the protocol configuration information DB 22*e* stores the protocol configuration information, such as the network configuration of each protocol, about the respective protocols and the provisioning for combining protocols. The protocol configuration information DB 22*e* stores a template having "management key, No (order), model, address, interface, ID(1), ID(2), ID(3), ID(4)". The protocol configuration information DB 22*e* holds the information which the later described data standardizing unit 26 or the combined information generating unit 27 has stored into the template. That is, the data standardizing unit 26 or the combined information generating unit 27 extracts information from data received from the management terminal 1, and stores the information into the template, in accordance with the information stored in the protocol information storage location settings files 22c. The protocol configuration information DB 22e then holds the information stored in the templates as the information about the provisioning.

The protocol configuration information DB 22e stores protocol configuration information relative to the information (A) through (E) stored in the protocol management information DB 22d. For example, the protocol configuration information DB 22e stores the protocol configuration information indicated as (A-1) through (A-5) in FIG. 7, relative to the (A) VLAN protocol management information. FIG. 7 is a diagram illustrating an example of the information about the VLAN stored in the protocol configuration information DB.

For example, the protocol configuration information DB 22e stores "VLAN 100, 1, model A, node A1, port 1, -, -, -, -" as (A-1). That is, the protocol configuration information DB 22e stores the protocol configuration information indicating that the VLAN having "VLAN 100" as the VLAN name and "100" as the VLAN-ID is connected to port 1 of the node A1 of the model A, with "VLAN 100" being the management key. The protocol configuration information DB 22e also stores "VLAN 100, 2, model A, node A1, port 2, -, -, -, -" as (A-2). That is, the protocol configuration information DB 22e stores the protocol configuration information indicating that the VLAN having "VLAN 100" as the VLAN name and "100" as the VLAN-ID is connected to port 2 of the node A1 of the model A, with "VLAN 100" being the management key.

The protocol configuration information DB 22e also stores "VLAN 100, 3, model A, node A2, port 3, -, -, -, -" as (A-3). That is, the protocol configuration information DB 22e stores the protocol configuration information indicating that the VLAN having "VLAN 100" as the VLAN name and "100" as the VLAN-ID is connected to port 3 of the node A2 of the model A, with "VLAN 100" being the management key. The protocol configuration information DB 22e also stores "VLAN 100, 4, model A, node A2, port 4, -, -, -, -" as (A-4). That is, the protocol configuration information DB 22e stores the protocol configuration information indicating that the VLAN having "VLAN 100" as the VLAN name and "100" as the VLAN-ID is connected to port 4 of the node A2 of the model A, with "VLAN 100" being the management key.

The protocol configuration information DB 22e also stores "VLAN 100, 5, model A, node A3, port 5, -, -, -, -" as (A-5). That is, the protocol configuration information DB 22e stores the protocol configuration information indicating that the VLAN having "VLAN 100" as the VLAN name and "100" as the VLAN-ID is connected to port 5 of the node A3 of the model A, with "VLAN 100" being the management key.

Further, the protocol configuration information DB 22e stores the protocol configuration information indicated as (B-1) and (B-2) in FIG. 8, relative to the (B) VPN (BGP) protocol management information. FIG. 8 is a diagram illustrating an example of the information about the VPN (BGP) stored in the protocol configuration information DB.

For example, the protocol configuration information DB 22e stores "VPN 20-1, 1, model B, node B1, port 1, 1.1.1.1, 1, bgp 1, -", as (B-1). That is, the protocol configuration information DB 22e stores the protocol configuration information indicating that the VPN using the BGP having "1.1.1.1" as the CE-WAN, "1" as the AS number, and "bgp 1" as the map name is connected to port 1 of the node B1 of the model B, with "VPN 20-1" being the management key.

The protocol configuration information DB 22e also stores "VPN 20-1, 2, model B, node B2, port 1, 1.1.2.2, 1, bgp 1, -", as (B-2). That is, the protocol configuration information DB 22e stores the protocol configuration information indicating that the VPN using the BGP having "1.1.2.2" as the CE-WAN, "1" as the AS number, and "bgp 1" as the map name is connected to port 1 of the node B2 of the model B, with "VPN 20-1" being the management key.

Further, the protocol configuration information DB 22e stores the protocol configuration information indicated as (C-1) through (C-3) in FIG. 9, relative to the (C) LSP protocol management information. FIG. 9 is a diagram illustrating an example of the information about the LSP stored in the protocol configuration information DB.

For example, the protocol configuration information DB 22e stores "Tunnel 3, 1, model B, node B2, -, 2.2.2.2, -, -, -", as (C-1). That is, the protocol configuration information DB 22e stores the protocol configuration information indicating that the LSP having "2.2.2.2" as the link start address is connected to port 2 of the node B2 of the model B, with "Tunnel 3" being the management key.

The protocol configuration information DB 22e also stores "Tunnel 3, 2, model B, node B2, -, 2.2.3.3, -, -, -", as (C-2). That is, the protocol configuration information DB 22e stores the protocol configuration information indicating that the LSP having "2.2.3.3" as the link start address is connected to port 2 of the node B2 of the model B, with "Tunnel 3" being the management key.

The protocol configuration information DB 22e also stores "Tunnel 3, 3, model B, node B2, -, 2.2.4.4, -, -, -", as (C-3). That is, the protocol configuration information DB 22e stores the protocol configuration information indicating that the LSP having "2.2.4.4" as the link start address is connected to port 2 of the node B2 of the model B, with "Tunnel 3" being the management key.

Further, the protocol configuration information DB 22e stores the protocol configuration information indicated as (D-1) in FIG. 10, relative to the (D) VLAN(Static) protocol management information. FIG. 10 is a diagram illustrating an example of the information about the VLAN(Static) stored in the protocol configuration information DB.

For example, the protocol configuration information DB 22e stores "VPN 20-2, 1, model D, node D, port 1, 6.6.6.0, ff.ff.ff.0, 1.1.1.1, -", as (D-1). That is, the protocol configuration information DB 22e stores the protocol configuration information indicating that the VPN having "6.6.6.0" as the NW address, "ff.ff.ff.0" as the NW mask, and "1.1.1.1" as the hop address is connected to port 1 of the node D of the model D, with "VPN 20-2" being the management key.

Further, the protocol configuration information DB 22e stores the protocol configuration information indicated as (E-1) in FIG. 11, relative to the (E) VLAN+VPN protocol management information. FIG. 11 is a diagram illustrating an example of the information about the VLAN+VPN stored in the protocol configuration information DB. For example, the protocol configuration information DB 22e stores "VPN 20-1, 1, model B, node B1, port 1, 100, 1.1.1.1, -, -", as (E-1). That is, the protocol configuration information DB 22e stores the protocol configuration information indicating that port 1 of the node B1 of the model B combines the VLAN having "100" as the VLAN-ID and the VPN having "1.1.1.1" as the CE-WAN, with "VPN 20-1" being the management key.

The above described files are information that is set and stored beforehand by the manager or the like. Although the protocols used in the networks such as a VPN and an LSP illustrated in FIG. 1 are illustrated in FIGS. 7 through 11, the present invention is not limited to them, and the information is stored for each protocol used in the networks managed by the network management control device 20. Also, the "VLAN" and the "VPN" as the subjects to be combined are combined in this example. However, the present invention is not limited to that, and any networks can be combined. In that case, a protocol information storage location file may be provided for each of the subjects to be combined.

The information (A) through (D) described above are the information stored by the data standardizing unit 26, and the information (E) is the information generated and stored by the combined information generating unit 27. Therefore, the information (A) through (E) is empty databases before the data standardizing unit 26 or the combined information generating unit 27 stores information. FIGS. 7 through 11 illustrate situations where the data standardizing unit 26 or the combined information generating unit 27 has stored information.

Figure 12:
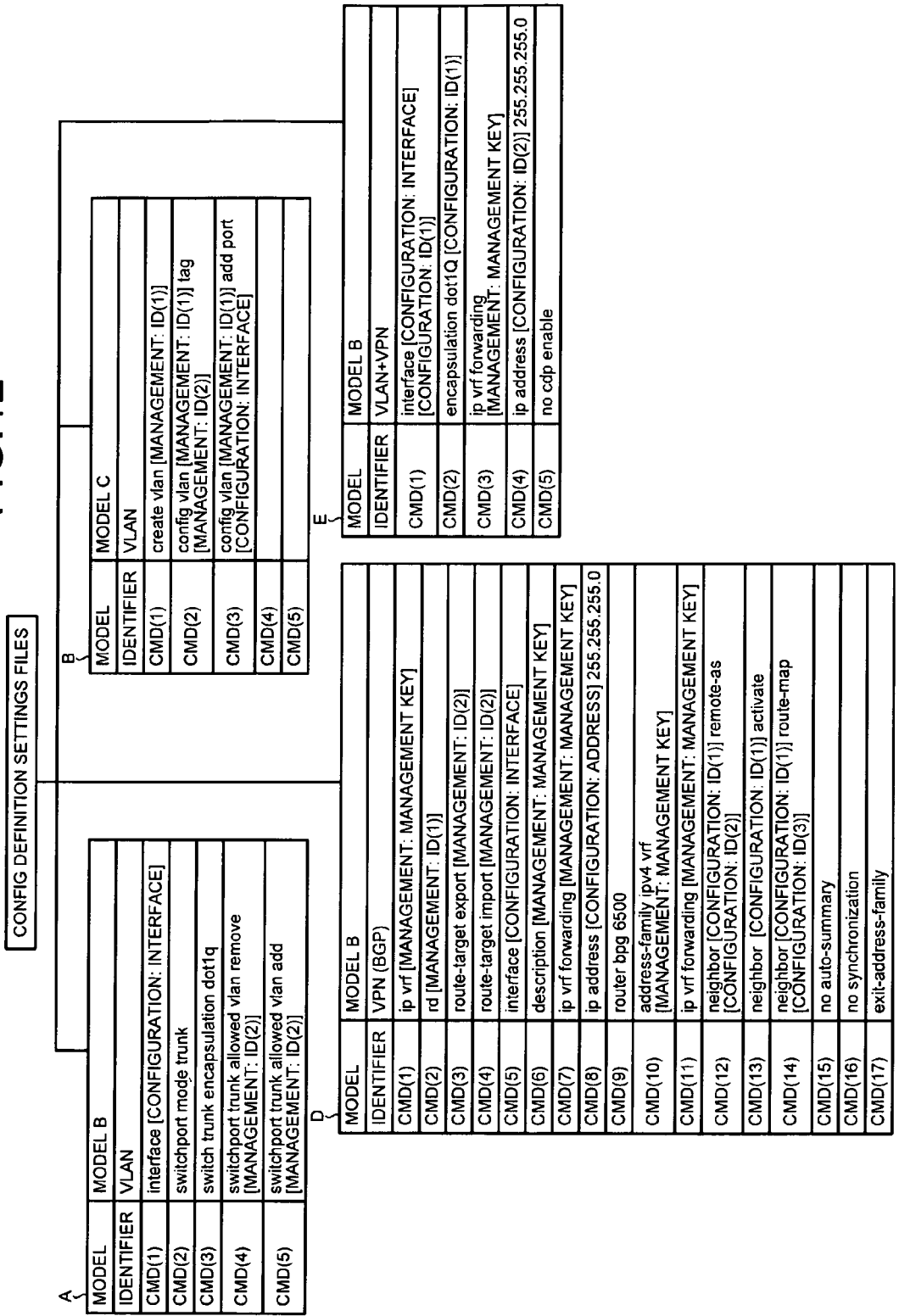
FIG. 12 is a diagram illustrating an example of the information stored in the config definition settings files.

Referring back to FIG. 2, the config definition settings files 22f store commands in accordance with the respective protocols and protocol combination information. Specifically, the config definition settings files 22f store configurations associated with the models of nodes and the protocols used by the respective models. For example, the config definition settings files 22f store the configurations (A), (B), (D), and (E) each having "model, identifier, CMD(1) through CMD(X) (X being an arbitrary natural number)", as illustrated in FIG. 12. FIG. 12 is a diagram illustrating an example of the information stored in the config definition settings files.

The "model" indicates the model used in the subject node, and the "identifier" indicates the protocol to which the subject node belongs. CMD (1) through CMD(5) indicate commands to be executed as the provisioning for the subject node. For example, the config definition settings files 22f store "CMD (1)=interface [configuration: interface], CMD(2)=switchport mode trunk" associated with "model B, VLAN". The config definition settings files 22f further store "CMD(3)=switch trunk encapsulation dot1q, CMD(4)=switchport trunk allowed vlan remove [management: ID(2)]" associated with "model B, VLAN". The config definition settings files 22f further store "CMD(5)=switchport trunk allowed vlan add [management: ID(2)]" associated with "model B, VLAN".

The config definition settings files 22f also store "CMD(1)=create vlan [management: ID(1)], CMD(2)=config vlan [management: ID(1)] tag [management: ID(2)]" associated with "model C, VLAN". The config definition settings files 22f further store "CMD(3)=config vlan [management: ID(1)] add port [configuration: interface]".

The config definition settings files 22f also store "CMD(1)=ip vrf [management: management key], CMD(2)=rd [management: ID(1)]" associated with "model B, VPN (BGP)". The config definition settings files 22f further store "CMD(3)=route target export [management: ID(2)]", "CMD(4)=route target import [management: ID(2)]", and "CMD(5)=interface [configuration: interface]". The config definition settings files 22f also store "CMD(6)=description [management: management key]", "CMD(7)=ip vrf forwarding [management: management key]", and "CMD(8)=ip address [configuration: address] 255.255.255.0".

The config definition settings files 22f also store "CMD(9)=router bgp 6500" and "CMD(10)=address-family ipv4 vrf [management: management key]" associated with "model B, VPN (BGP)". The config definition settings files 22f further store "CMD(11)=ip vrf forwarding [management: management key]" and "CMD(12)=neighbor [configuration: ID(1) remote-as [configuration: ID(2)]]". The config definition settings files 22f also store "CMD(13)=neighbor [configuration: ID(1)] activate" and "CMD(14)=neighbor [configuration: ID(1)] route-map [configuration: ID(3)]".

The config definition settings files 22f also store "CMD(15)=no auto-summary", "CMD(16)=no synchronization", and "CMD(17)=exit-address-family" associated with "model B, VPN (BGP)".

The config definition settings files 22f also store "CMD(1)=interface [configuration: interface] [configuration: ID(1)], CMD(2)=encapsulation dot1q [configuration: ID(1)]" associated with "model B, VLAN+VPN". The config definition settings files 22f further store "CMD(3)=ip vrf forwarding [management: management key]", "CMD(4)=ip address [configuration: ID(2)] 255.255.255.0", and "CMD (5)=no cdp enable".

In the above described CMDs, "management: management key" and "configuration: ID(1)" indicate the values to be input. In the case of "management: management key", for example, the value of "management key" stored in the protocol management information DB 22d is to be input. In the case of "configuration: ID(1)", the value of "ID(1)" stored in the protocol configuration information DB 22e is to be input. The inputting of those values is performed by a command generating unit 28. For example, in a case where CMD(1) of (A) in FIG. 12 is carried out, the command generating unit 28 obtains the value of "interface" from the information stored as "model B, VLAN" in the protocol configuration information DB 22e, and assigns the value to the "configuration: interface" of CMD(1), to generate CMD(1).

The above described files are information that is set and stored beforehand by the manager or the like. Although the protocols used in the networks such as a VPN and an LSP illustrated in FIG. 1 are illustrated in FIG. 12, the present invention is not limited to them, and the information is stored for each protocol used in the networks managed by the network management control device 20.

Referring back to FIG. 2, the control unit 23 is an integrated circuit such as an Application Specific Integrated Circuit (ASIC), or an electronic circuit such as a Central Processing Unit (CPU) or a Micro Processing Unit (MPU). The control unit 23 has an internal memory for storing a control program such as an Operating System (OS), a program that specifies various kinds of procedures, and necessary data. The control unit 23 further includes a network configuration managing unit 24, the provisioning request receiving unit 25, the data standardizing unit 26, the combined information generating unit 27, the command generating unit 28, and the Telnet executing unit 29. The control unit 23 performs various kinds of operations with those components.

The network configuration managing unit 24 receives link information and node information via the communication control interface unit 21. The network configuration managing unit 24 then updates the link information DB 22b with the received link information, and updates the node information DB 22a with the received node information. For example, the network configuration managing unit 24 receives link information and node information to be newly added, and stores the information into the node information DB 22a and the link information DB 22b. The network configuration managing unit 24 also receives link information and node information to be deleted, and deletes the information from the node information DB 22a and the link information DB 22b.

The provisioning request receiving unit 25 receives various kinds of operations and information from the management terminal 1 via the communication control interface unit 21, and outputs them to each control unit. For example, upon receipt of a provisioning start instruction, the provisioning request receiving unit 25 instructs the data standardizing unit 26 and the combined information generating unit 27 to start an operation. The provisioning request receiving unit 25 also receives the settings information about each protocol from the management terminal 1, and outputs the information to the data standardizing unit 26.

The data standardizing unit 26 stores the information about each protocol in a common format into the protocol management information DB 22*d* or the protocol configuration information DB 22*e*, in compliance with the storage locations stored in the protocol information storage location settings files 22*c*. The operation to be performed by the data standardizing unit 26 will be described later in detail with reference to FIGS. 13 through 17, and therefore, only the gist of the operation is now described.

For example, the data standardizing unit 26 extracts information from VLAN settings information received by the provisioning request receiving unit 25, in compliance with the (A) model A (VLAN) storage location file stored in the protocol information storage location settings files 22*c*. The data standardizing unit 26 then determines the storage location for the extracted information in accordance with the (A) model A (VLAN) storage location file. The data standardizing unit 26 then stores the information extracted from the received VLAN settings information into the determined storage location in the protocol management information DB 22*d* or the protocol configuration information DB 22*e*.

The combined information generating unit 27 generates the combined information between the networks, based on the information about the connections between the nodes stored in the link information DB 22*b* and the network configuration information received by the provisioning request receiving unit 25. In other words, the combined information generating unit 27 identifies a combining point from the configuration information about the protocols to be combined and the link information DB 22*b* forming the network, and generates the information that combines the protocols. The operation to be performed by the combined information generating unit 27 will be described later in detail with reference to FIGS. 18 through 26, and therefore, only the gist of the operation is now described.

Specifically, the combined information generating unit 27 refers to the protocol management information DB 22*d* or the protocol configuration information DB 22*e*, and the protocol information storage location settings files 22*c*, with respect to the protocols received by the provisioning request receiving unit 25 as the subjects to be combined. The combined information generating unit 27 then identifies the protocol management information and the protocol configuration information about the subjects to be combined. The combined information generating unit 27 extracts information from the identified protocol management information and the protocol configuration information, in compliance with the protocol information storage location settings files 22*c*. The combined information generating unit 27 stores the extracted information into the designated storage location, and generates the information that combines the protocols.

The command generating unit 28 generates settings contents as the provisioning to be stored into the protocol information storage location settings files 22*c*. The operation to be performed by the command generating unit 28 will be described later in detail with reference to FIGS. 27 through 29, and therefore, only the gist of the operation is now described.

For example, the command generating unit 28 specifies a device and a protocol (an identifier) from the information stored in the protocol management information DB 22*d* or the protocol configuration information DB 22*e* by the data standardizing unit 26 or the combined information generating unit 27. The command generating unit 28 then identifies the config definition settings files 22*f* corresponding to the identified device and protocol (identifier) from the protocol information storage location settings files 22*c*. After that, the command generating unit 28 sequentially outputs the CMDs stored in the identified config definition settings files 22*f* to the Telnet executing unit 29.

The Telnet executing unit 29 performs the actual provisioning on the network device. For example, upon receipt of a CMD from the command generating unit 28, the Telnet executing unit 29 activates the Telnet and connects the Telnet to the corresponding node. The Telnet executing unit 29 then issues the CMD to the corresponding node via the Telnet, and transmits the response to the command generating unit 28.

Flow in Operation

Figure 27:
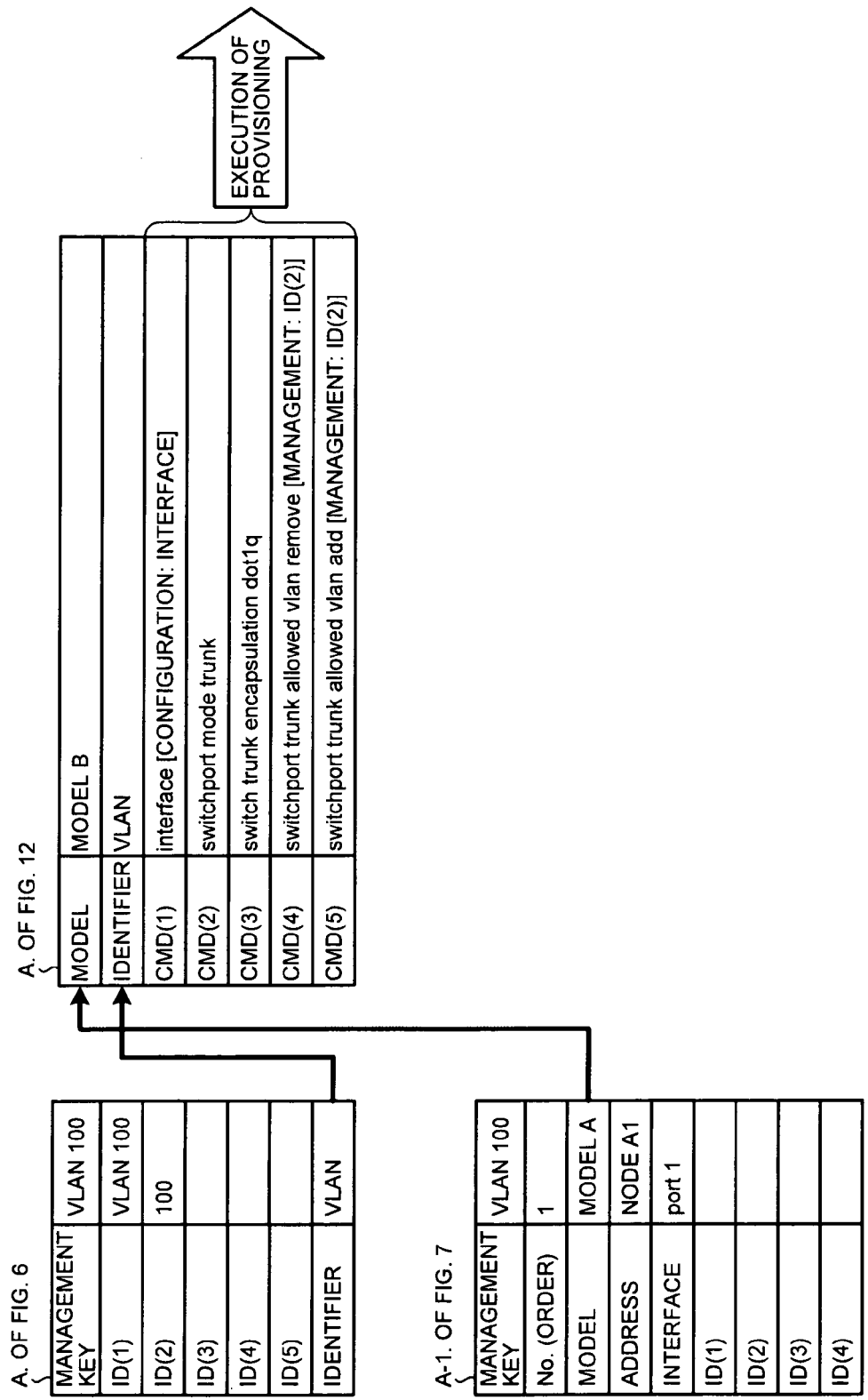
FIG. 27 is a diagram illustrating an example of execution of a provisioning process for a VLAN.
Figure 28:
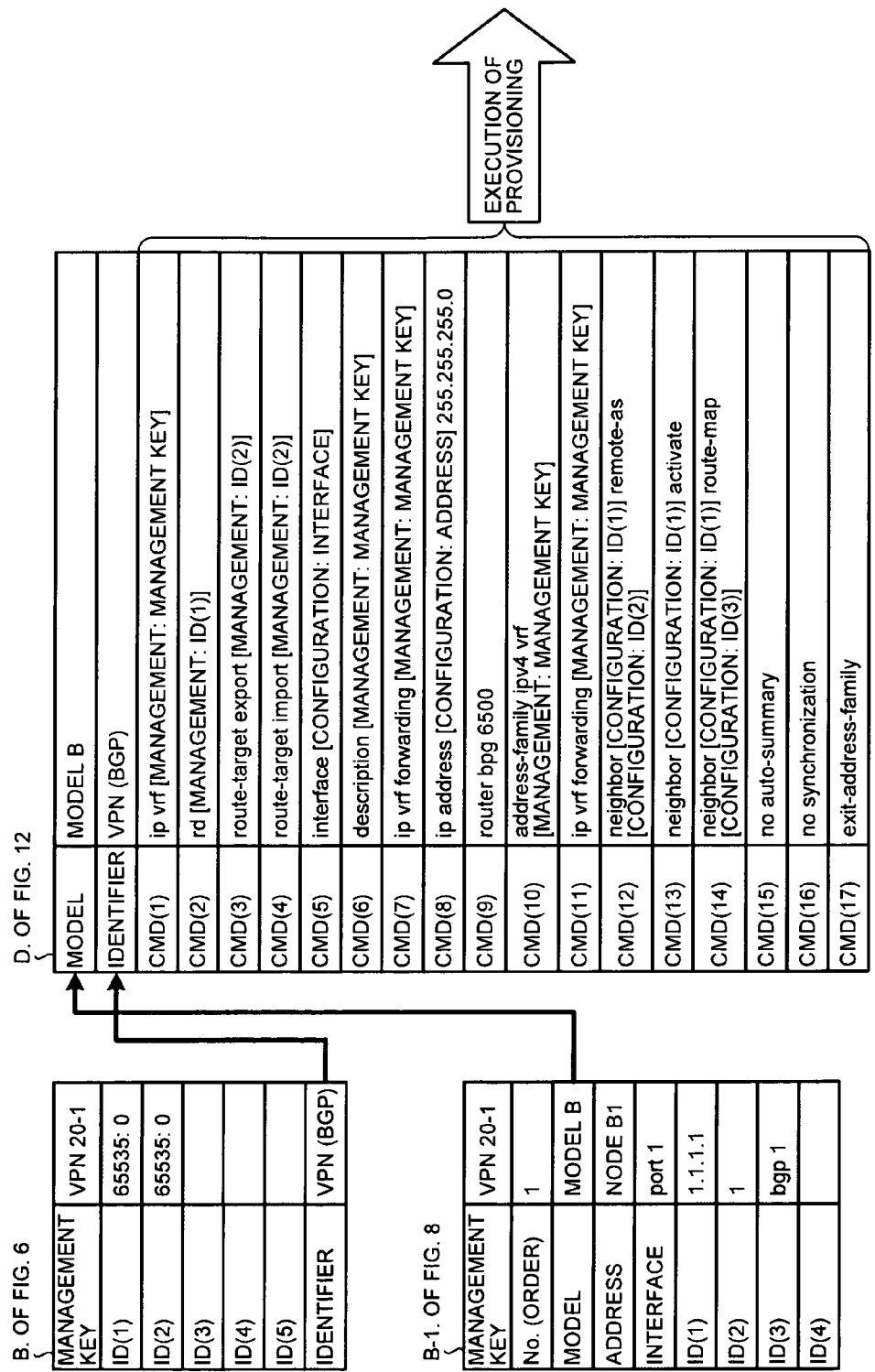
FIG. 28 is a diagram illustrating an example of execution of a provisioning process for a VPN.
Figure 29:
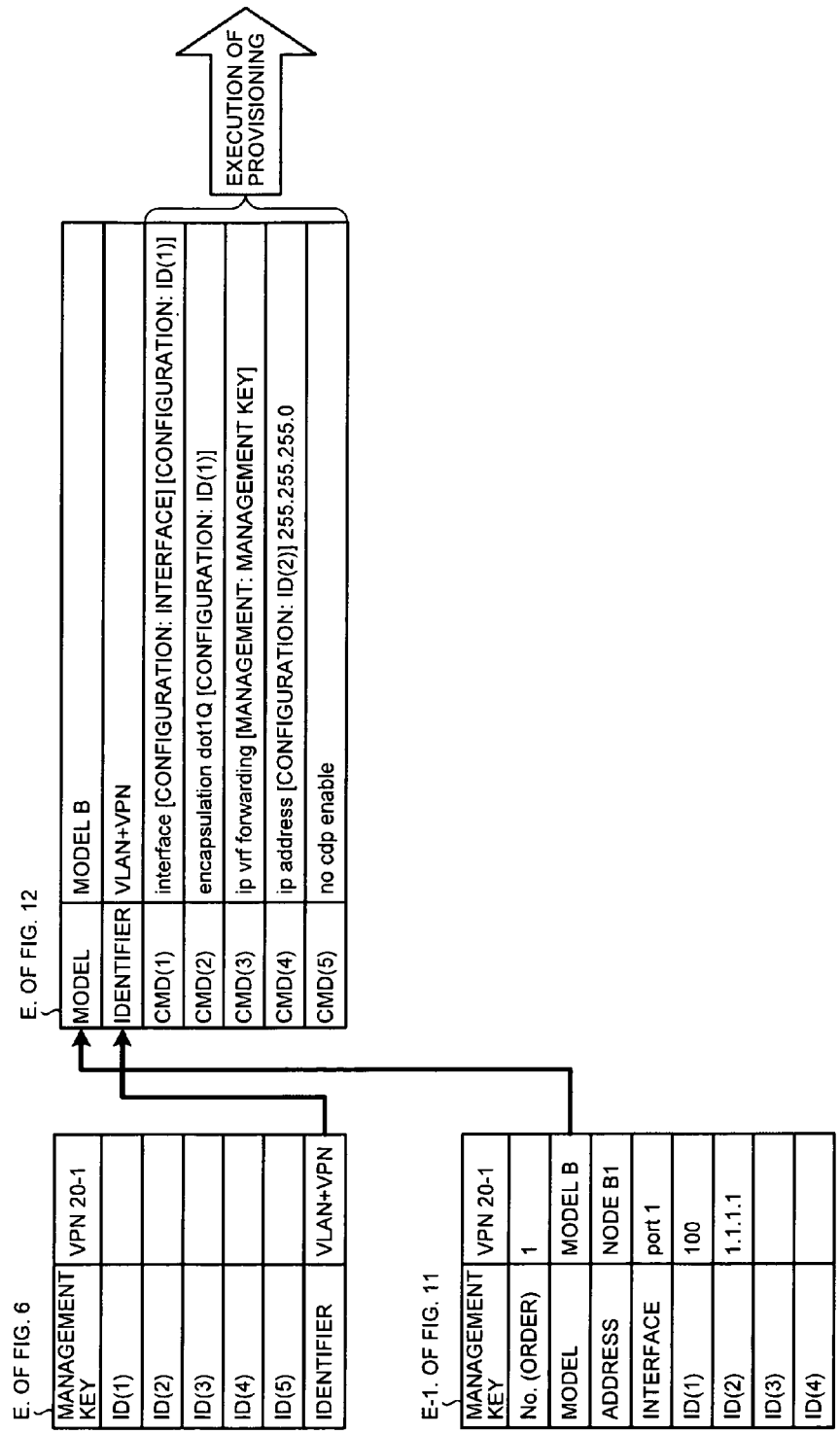
FIG. 29 is a diagram illustrating an example of execution of a provisioning process for subjects to be combined (VPN+VLAN)

Referring now to FIGS. 13 through 29, the flow in the provisioning operation to be performed by the network management control device according to the second embodiment is described. Specifically, referring to FIG. 13, the flow in the entire provisioning operation will be described. Referring to FIGS. 14 through 17, an operation to generate protocol management information or protocol configuration information is described. Also, referring to FIGS. 18 through 26, a protocol combining operation is described. Referring to FIGS. 27 through 29, execution of the provisioning process is described.

Flow in Provisioning Operation

Figure 13:
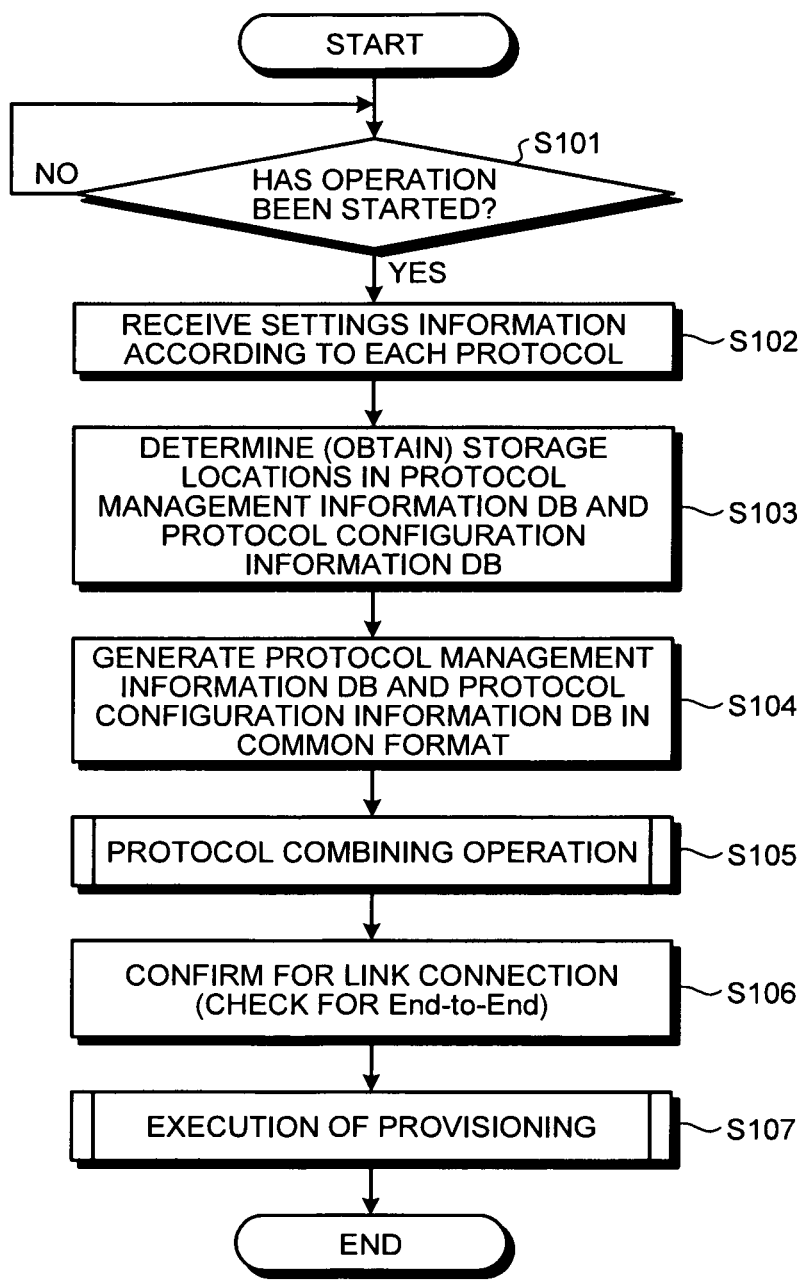
FIG. 13 is a flowchart illustrating the flow in a provisioning operation to be performed by the network management control device according to the second embodiment.

Referring first to FIG. 13, the flow in the entire provisioning operation is described. FIG. 13 is a flowchart illustrating the flow in the provisioning operation to be performed by the network management control device according to the second embodiment. This operation includes the procedures of S101 through S104 to be carried out to generate protocol management information or protocol configuration information, the procedure of S105 to be carried out to combine protocols, the procedure of S106 to be carried out to confirm a connection between links, and the procedure of S107 to be carried out to execute the provisioning process.

As illustrated in FIG. 13, when an operation start instruction is issued ("Yes" in step S101), the provisioning request receiving unit 25 of the network management control device 20 receives the settings information about each protocol (step S102).

The data standardizing unit 26 determines storage locations in the protocol management information DB 22*d* and the protocol configuration information DB 22*e* from the protocol information storage location settings files 22*c* (step S103). The data standardizing unit 26 generates the protocol management information DB 22*d* and the protocol configuration information DB 22*e* in a common format for the respective protocols (step S104).

After that, the combined information generating unit 27 uses the protocol management information DB 22*d* and the protocol configuration information DB 22*e* generated in the common format, to perform the protocol combining operation (step S105).

After confirming the link connection (step S106), the command generating unit 28 performs provisioning (step S107). For example, to confirm the link connection, the command generating unit 28 checks whether End-to-End has been set in the protocol management information DB 22*d* and the protocol configuration information DB 22*e*. That is, the command generating unit 28 checks whether provisioning setting has been performed on the adjacent nodes, or whether the protocol management information DB 22*d* and the protocol configuration information DB 22*e* have been registered in the adjacent nodes.

Operation to Generate Protocol Management Information or Protocol Configuration Information Referring now to FIGS. 14 through 17, the operation to generate protocol management information or protocol configuration information, which corresponds to steps S101 through S104 of FIG. 13, is described in detail. FIG. 14 is a diagram illustrating an example of VLAN settings information received from the management terminal. FIG. 15 is a diagram illustrating an example of VPN (BGP) settings information received from the management terminal. FIG. 16 is a diagram illustrating an example of LSP settings information received from the management terminal. FIG. 17 is a diagram illustrating an example of VPN(Static) settings information received from the management terminal.

The management terminal 1 outputs the settings screens for the respective protocols to a display unit such as a display device, and transmits protocol settings information (see FIGS. 14 through 17) that is input to the settings screens via a mouse or a keyboard, to the network management control device 20. The provisioning request receiving unit 25 transmits the protocol settings information received from the management terminal 1 to the data standardizing unit 26. After that, the data standardizing unit 26 stores the received protocol settings information in the common format into the protocol management information DB 22d and the protocol configuration information DB 22e.

Example of Storage in the Case of VLAN

The VLAN settings information illustrated in FIG. 14 is described as an example. The data standardizing unit 26 receives the VLAN settings information, "model=model A, VLAN name=VLAN 100, VLAN-ID=100, device=node A, interface=port 1" illustrated in FIG. 14.

Since the received settings information is the "VLAN information about the model A", the data standardizing unit 26 refers to the (A) model A (VLAN) storage location file in the protocol information storage location settings files 22c illustrated in FIG. 5. The data standardizing unit 26 also determines the protocol management information format to be the VLAN protocol management information illustrated as (A) in FIG. 6, and the protocol configuration information format to be the VLAN protocol configuration information illustrated in FIG. 7.

After that, in accordance with the (A) model A (VLAN) storage location file, the data standardizing unit 26 extracts information from the received settings information, and stores the information in the determined protocol management information format and protocol configuration information format.

Specifically, as the storage location settings file indicates "item=VLAN name, storage location=management key", the data standardizing unit 26 stores "VLAN name=VLAN 100" of the received settings information into "management key" in the protocol management information DB 22d. As the storage location settings file also indicates "item=VLAN name, storage location=management: ID(1)", the data standardizing unit 26 stores "VLAN name=VLAN 100" of the received settings information into "ID(1)" in the protocol management information DB 22d. As the storage location settings file also indicates "item=VLAN-ID, storage location=management: ID(2)", the data standardizing unit 26 stores "VLAN-ID=100" of the received settings information into "ID(2)" in the protocol management information DB 22d.

Further, as the storage location settings file indicates "item=device, storage location=configuration: address", the data standardizing unit 26 stores "device=node A" of the received settings information into "address" in the protocol configuration information DB 22e. As the storage location settings file also indicates "item=interface, storage location=configuration: interface", the data standardizing unit 26 stores "interface=port 1" of the received settings information into "interface" in the protocol configuration information DB 22e. It may be noted that the information stored in the protocol configuration information DB 22e is the settings information about "VLAN name=VLAN 100". Therefore, the data standardizing unit 26 stores "VLAN name=VLAN 100" into "management key" in the protocol configuration information DB 22e. As a result, as illustrated in FIG. 7, the protocol management information and the protocol configuration information can be linked to each other, though being managed independently of each other.

Example of Storage in the Case of VPN (BGP)

The VPN (BGP) settings information illustrated in FIG. 15 is now described as an example. The data standardizing unit 26 receives "model=model B, VRF name=VPN 20-1, RD value=65535:0, RT value=65535:0, device=node B, interface=port 1, CE-WAN=1.1.1.1, AS number=1, map name=bgp1" illustrated in FIG. 15.

Since the received settings information is the "VPN(BGP) information about the model B", the data standardizing unit 26 refers to the (B) model B (VPN(BGP)) storage location file in the protocol information storage location settings files 22c illustrated in FIG. 5. The data standardizing unit 26 also determines the protocol management information format to be the VPN(BGP) protocol management information illustrated as (B) in FIG. 6, and the protocol configuration information format to be the VPN(BGP) protocol configuration information illustrated in FIG. 8.

After that, in accordance with the (B) model B (VPN (BGP)) storage location file, the data standardizing unit 26 extracts information from the received settings information, and stores the information in the determined protocol management information format and protocol configuration information format.

Specifically, as the storage location settings file indicates "item=VRF name, storage location=management key", the data standardizing unit 26 stores "VRF name=VPN 20-1" of the received settings information into "management key" in the protocol management information DB 22d. As the storage location settings file also indicates "item=RD value, storage location=management: ID(1)", the data standardizing unit 26 stores "RD value=65535:0" of the received settings information into "ID(1)" in the protocol management information DB 22d. As the storage location settings file also indicates "item=RT value, storage location=management: ID(2)", the data standardizing unit 26 stores "RT value=65535:0" of the received settings information into "ID(2)" in the protocol management information DB 22d.

Further, as the storage location settings file indicates "item=device, storage location=configuration: address", the data standardizing unit 26 stores "device=node B" of the received settings information into "address" in the protocol configuration information DB 22e. As the storage location settings file also indicates "item=interface, storage location=configuration: interface", the data standardizing unit 26 stores "interface=port 1" of the received settings information into "interface" in the protocol configuration information DB 22e.

As the storage location settings file also indicates "item=CE-WAN, storage location=configuration: ID(1)", the data standardizing unit 26 stores "CE-WAN=1.1.1.1" of the received settings information into "ID(1)" in the protocol configuration information DB 22e. As the storage location settings file also indicates "item=AS number, storage location=configuration: ID(2)", the data standardizing unit 26 stores "AS number=1" of the received settings information into "ID(2)" in the protocol configuration information DB 22e. As the storage location settings file also indicates "item=map name, storage location=configuration: ID(3)", the data standardizing unit 26 stores "map name=bgp1" of the received settings information into "ID(3)" in the protocol configuration information DB 22e. It may be noted that the information stored in the protocol configuration information DB 22e is the settings information about "VRF name=VPN 20-1". Therefore, the data standardizing unit 26 stores "VRF name=VPN 20-1" into "management key" in the protocol configuration information DB 22e. As a result, as illustrated in FIG. 8, the protocol management information and the protocol configuration information can be linked to each other, though being managed independently of each other.

Example of Storage in the Case of LSP

The LSP settings information illustrated in FIG. 16 is now described as an example. The data standardizing unit 26 receives "model=model B, LSP name=LSP 3, tunnel name=Tunnel 3, PE address start=node B, priority=10, hop address=2.2.2.2, hop address=2.2.3.3, hop address=2.2.4.4, PE address end=node D" illustrated in FIG. 16.

Since the received settings information is the "LSP information about the model B", the data standardizing unit 26 refers to the (C) model B (LSP) storage location file in the protocol information storage location settings files 22c illustrated in FIG. 5. The data standardizing unit 26 also determines the protocol management information format to be the LSP protocol management information illustrated as (C) in FIG. 6, and the protocol configuration information format to be the LSP protocol configuration information illustrated in FIG. 9.

After that, in accordance with the (C) model B (LSP) storage location file, the data standardizing unit 26 extracts information from the received settings information, and stores the information in the determined protocol management information format and protocol configuration information format.

Specifically, as the storage location settings file indicates "item=tunnel name, storage location=management key", the data standardizing unit 26 stores "tunnel name=Tunnel 3" of the received settings information into "management key" in the protocol management information DB 22d. As the storage location settings file also indicates "item=LSP name, storage location=management: ID(1)", the data standardizing unit 26 stores "LSP name=LSP 3" of the received settings information into "ID(1)" in the protocol management information DB 22d.

As the storage location settings file also indicates "item=PE address start, storage location=management: ID(2)", the data standardizing unit 26 stores "PE address start=node B" of the received settings information into "ID (2)" in the protocol management information DB 22d. As the storage location settings file also indicates "item=priority, storage location=management: ID(3)", the data standardizing unit 26 stores "priority=10" of the received settings information into "ID(3)" in the protocol management information DB 22d.

Further, as the storage location settings file indicates "item=hop address, storage location=configuration: address", the data standardizing unit 26 stores "hop address=2.2.2.2" of the received settings information into "address" in the protocol configuration information DB 22e. As the storage location settings file also indicates "item=PE address end, storage location=management: ID(4)", the data standardizing unit 26 stores "PE address end=node D" of the received settings information into "ID(4)" in the protocol management information DB 22d.

It may be noted that the information stored in the protocol configuration information DB 22e is the settings information about "tunnel name=Tunnel 3". Therefore, the data standardizing unit 26 stores "tunnel name=Tunnel 3" into "management key" in the protocol configuration information DB 22e. As a result, the protocol management information and the protocol configuration information can be linked to each other, though being managed independently of each other.

The difference from the cases of the VLAN and the VPN is that "hop address=2.2.3.3, hop address=2.2.4.4" contained in the received settings information are not stored into the protocol configuration information DB 22e in the above described operation. Therefore, to store the hop addresses into the protocol configuration information DB 22e, a few pieces of protocol configuration information having "tunnel name=Tunnel 3" as the "management key" are provided. When the few pieces of configuration information are provided, "model=model B, PE address start=node B" are stored into "model" and "address" in the protocol management information DB 22d, and "No.(order)" indicating the hop address order is also stored.

That is, "management key=Tunnel 3, No.=1, model=model B, address=node B, interface=ID(1)=2.2.2.2, ID(2)=-, ID(3)=-, ID(4)=-" is generated as a set of protocol configuration information. Also, "management key=Tunnel 3, No.=2, model=model B, address=node B, interface= ID(1)=2.2.3.3, ID(2)=-, ID(3)=-, ID(4)=-" is generated as another set of protocol configuration information. Further, "management key=Tunnel 3, No.=3, model=model B, address=node B, interface=-, ID(1)=2.2.4.4, ID(2)=-, ID(3)=-, ID(4)=-" is generated as yet another set of protocol configuration information.

As a result, the protocol management information and the protocol configuration information can be linked to each other as illustrated in FIG. 9, and all the received settings information can be stored in the configuration information.

Example of Storage in the Case of VPN(Static)

The VPN(Static) settings information illustrated in FIG. 17 is now described as an example. The data standardizing unit 26 receives "model=model D, VRF name=VPN 20-2, RD value=65535:0, RT value=65535:0, device=node D, interface=port 1, NW address=6.6.6.0, NW mask=ff.ff.ff.0, hop address=1.1.1.1" illustrated in FIG. 17.

Since the received settings information is the "VPN(Static) information about the model D", the data standardizing unit 26 refers to the (D) model D (VPN(Static)) storage location file in the protocol information storage location settings files 22c illustrated in FIG. 5. The data standardizing unit 26 also determines the protocol management information format to be the VPN(Static) protocol management information illustrated as (D) in FIG. 6, and the protocol configuration information format to be the VPN(Static) protocol configuration information illustrated in FIG. 10.

After that, in accordance with the (D) model D (VPN (Static)) storage location file, the data standardizing unit 26 extracts information from the received settings information, and stores the information in the determined protocol management information format and protocol configuration information format.

Specifically, as the storage location settings file indicates "item=VRF name, storage location=management key", the data standardizing unit 26 stores "VRF name=VPN 20-2" of the received settings information into "management key" in the protocol management information DB 22d. As the storage location settings file also indicates "item=RD value, storage location=management: ID(1)", the data standardizing unit 26 stores "RD value=65535:0" of the received settings information into "ID(1)" in the protocol management information DB 22*d*. As the storage location settings file also indicates "item=RT value, storage location=management: ID(2)", the data standardizing unit 26 stores "RT value=65535:0" of the received settings information into "ID(2)" in the protocol management information DB 22*d*.

Further, as the storage location settings file indicates "item=device, storage location=configuration: address", the data standardizing unit 26 stores "device=node D" of the received settings information into "address" in the protocol configuration information DB 22*e*. As the storage location settings file also indicates "item=interface, storage location=configuration: interface", the data standardizing unit 26 stores "interface=port 1" of the received settings information into "interface" in the protocol configuration information DB 22*e*.

As the storage location settings file also indicates "item=NW address, storage location=configuration: ID(1)", the data standardizing unit 26 stores "NW address=6.6.6.0" of the received settings information into "ID(1)" in the protocol configuration information DB 22*e*. As the storage location settings file also indicates "item=NW mask, storage location=configuration: ID(2)", the data standardizing unit 26 stores "NW mask=ff.ff.ff.0" of the received settings information into "ID(2)" in the protocol configuration information DB 22*e*. As the storage location settings file also indicates "item=hop address, storage location=configuration: ID(3)", the data standardizing unit 26 stores "hop address=1.1.1.1" of the received settings information into "ID(3)" in the protocol configuration information DB 22*e*. It may be noted that the information stored in the protocol configuration information DB 22*e* is the settings information about "VRF name=VPN 20-2". Therefore, the data standardizing unit 26 stores "VRF name=VPN 20-2" into "management key" in the protocol configuration information DB 22*e*. As a result, as illustrated in FIG. 10, the protocol management information and the protocol configuration information can be linked to each other, though being managed independently of each other.

Flow in the Protocol Combining Operation

Figure 18:
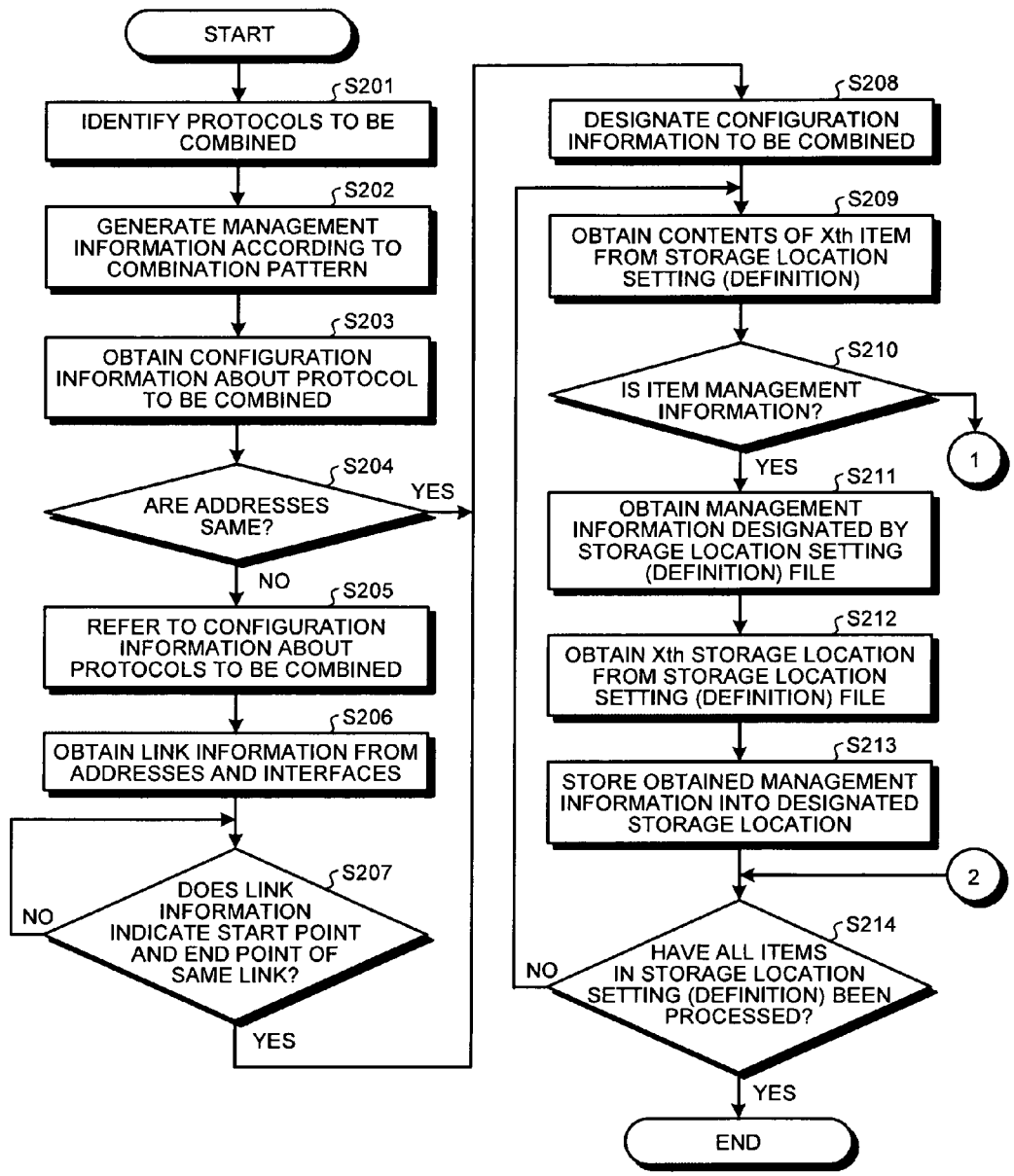
FIG. 18 is a flowchart illustrating a flow in a protocol combining operation.
Figure 19:
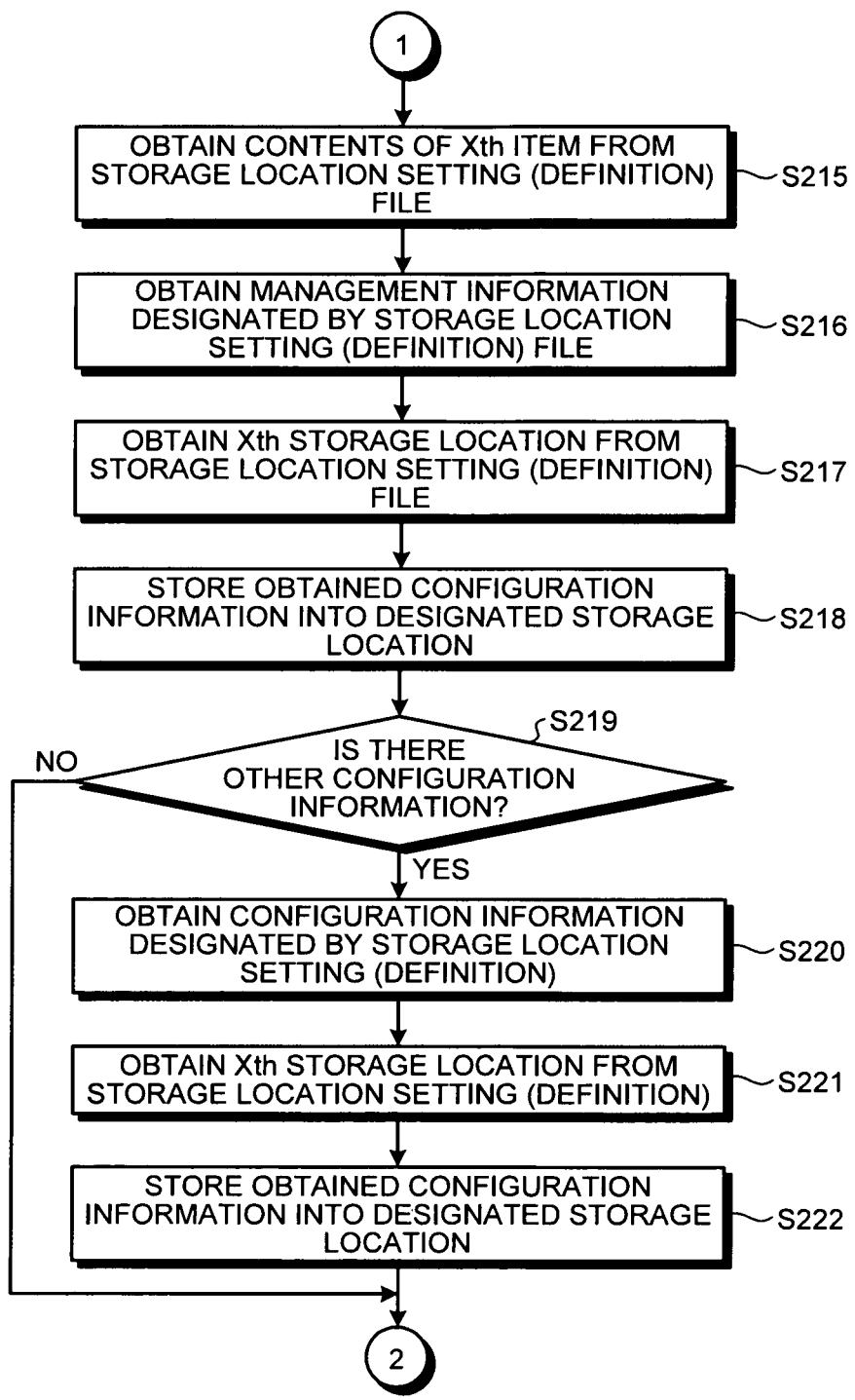
FIG. 19 is a flowchart illustrating a flow in the protocol combining operation.

Referring now to FIGS. 18 and 19, the protocol combining operation of step S105 of FIG. 13 is described in detail. FIGS. 18 and 19 are flowcharts illustrating the flow in the protocol combining operation.

As illustrated in FIG. 18, the combined information generating unit 27 identifies protocols to be combined (step S201), and generates management information in accordance with the identified combination pattern (step S202).

Figure 20:
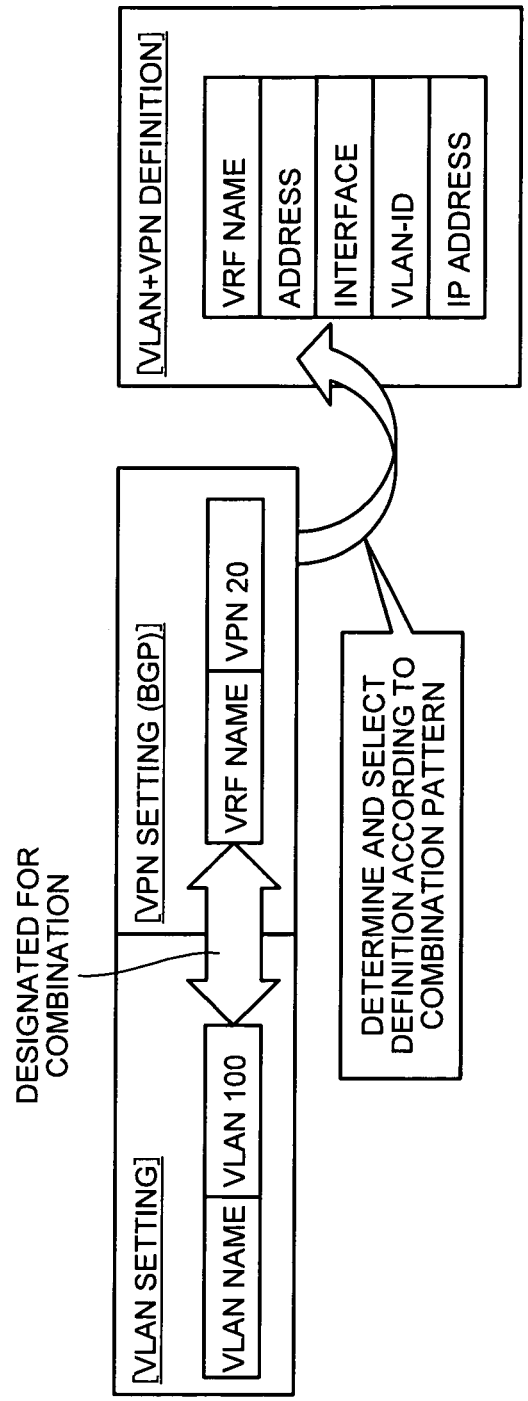
FIG. 20 is a diagram illustrating an example of the management information settings according to a combination pattern.
Figure 21:
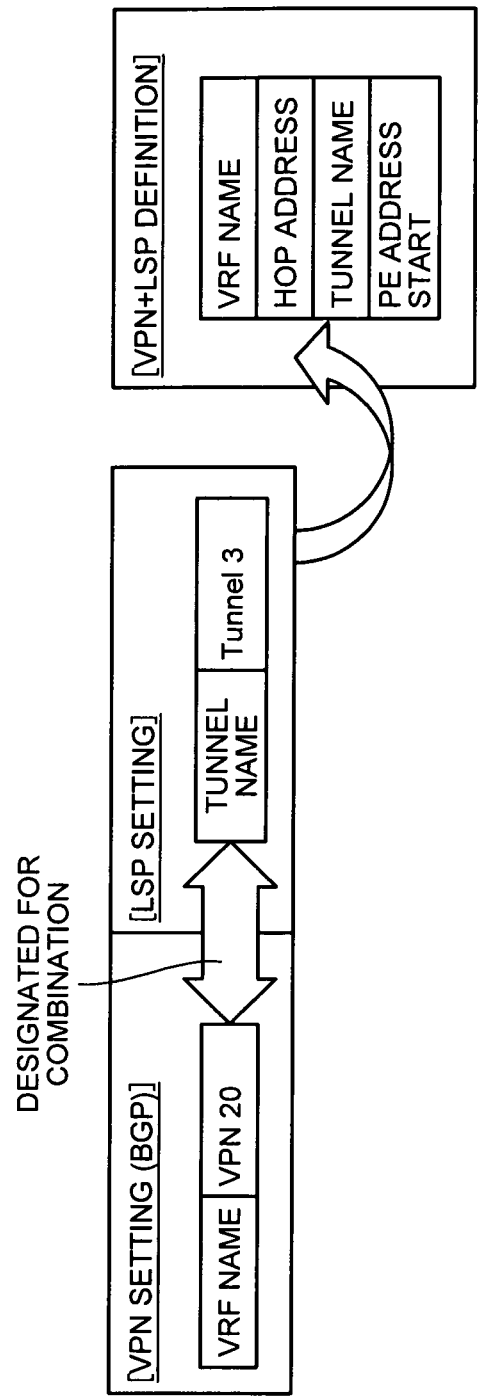
FIG. 21 is a diagram illustrating an example of the management information settings according to another combination pattern.

For example, in a case where the protocols set by the management terminal 1 as the subjects to be combined are "VLAN" and "VPN (BGP)", the combined information generating unit 27 designates a definition file (template) of the protocol management information DB 22*d* in accordance with this combination, as illustrated in FIG. 20. In a case where the protocols to be combined are "VPN(BGP)" and "LSP", the combined information generating unit 27 designates a definition file (template) of the protocol management information DB 22*d* in accordance with this combination, as illustrated in FIG. 21. FIGS. 20 and 21 are diagrams illustrating example settings of the management information according to the respective combination patterns.

Figure 22:
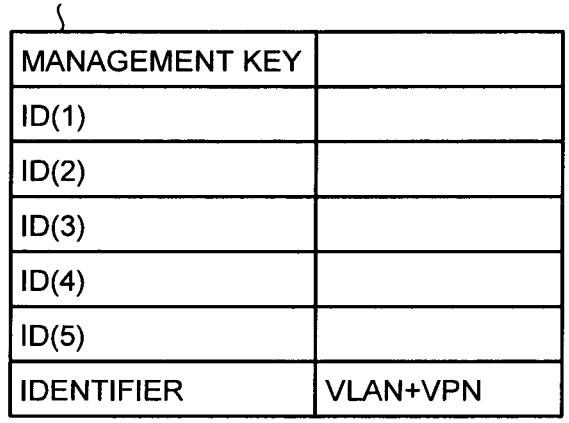
FIG. 22 is a diagram illustrating an example of the protocol management information identified as the information about the combination between the VLAN and the VPN.

In FIG. 18, the combined information generating unit 27 designates the definition file (template) of the protocol management information DB 22*d* illustrated in FIG. 22. FIG. 22 is a diagram illustrating an example of the protocol management information defined as the information about the combination between the VLAN and the VPN.

Referring back to FIG. 18, the combined information generating unit 27 obtains the configuration information about the protocols to be combined (step S203), and determines whether the configuration information indicates the same address (step S204). For example, the combined information generating unit 27 obtains the VLAN configuration information and the VPN configuration information stored in the protocol management information DB 22*d*, and determines whether the "addresses" contained in the configuration information have the same value. That is, the combined information generating unit 27 determines whether the subjects to be combined are the same node. At this point, the combined information generating unit 27 examines the combinations of all the VLAN configuration information and all the VPN configuration information stored in the protocol management information DB 22*d*.

If the "addresses" contained in the configuration information do not have the same value ("No" in step S204), the combined information generating unit 27 refers to the configuration information about the protocols to be combined (step S205), and obtains link information from the addresses and interfaces (step S206). The combined information generating unit 27 then determines whether the configuration information about the protocols to be combined indicates the start point and end point of the same link (step S207). If the configuration information of the protocols to be combined indicates the start point and end point of the same link ("Yes" in step S207), the combined information generating unit 27 designates the checked configuration information about the protocols as the subjects to be combined (step S208). The procedures of steps S205 through S207 are carried out on all the combinations of the protocol information extracted in steps S203 and S204. If the "addresses" contained in the configuration information have the same value ("Yes" in step S204), the combined information generating unit 27 carries out the procedure of step S208.

Figure 23:
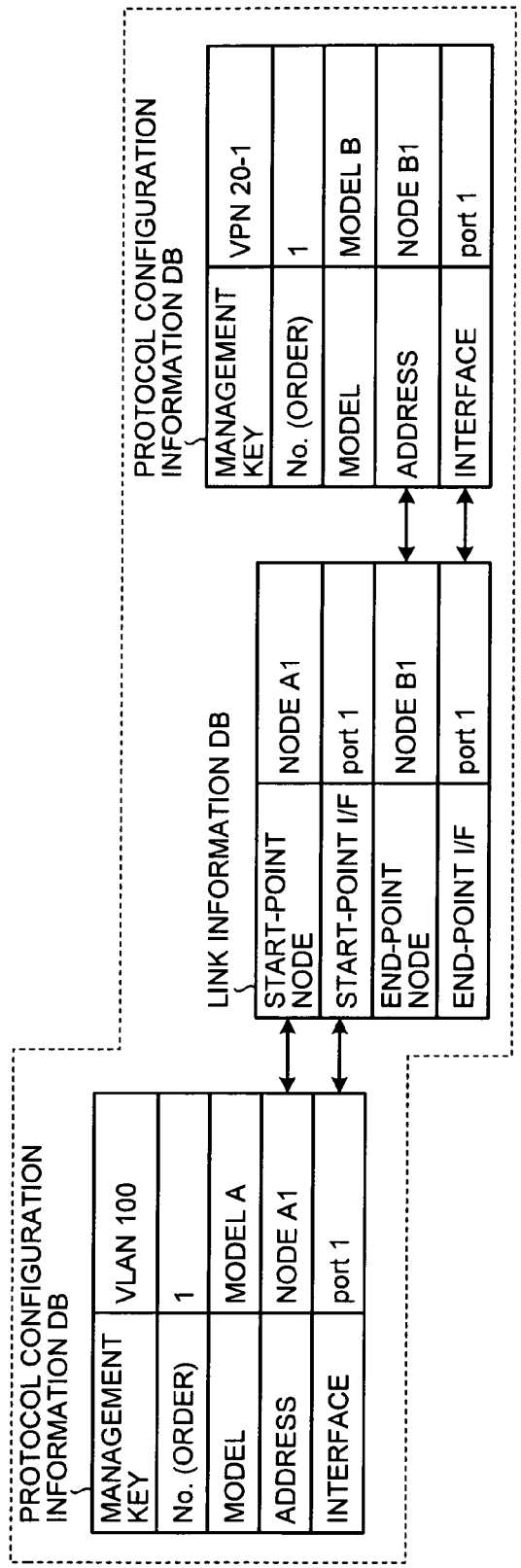
FIG. 23 is a diagram illustrating an example of link information designated as subjects to be combined.

For example, the VLAN configuration information is "management key=VLAN 100, No.=1, model=model A, address=node A1, interface=port 1". The VPN configuration information is "management key=VPN 20-1, No.=1, model=model B, address=node B1, interface=port 1", for example. The link information is stored as "start-point node=node A1, start-point I/F=port 1, end-point node=node B1, end-point I/F=port 1", for example. In this case, the combined information generating unit 27 determines that there is a link having "address=node A1, interface=port 1" of the VLAN configuration information as the start point, and "address=node B1, interface=port 1" of the VPN configuration information as the end point, as illustrated in FIG. 23. Accordingly, in this example, the combined information generating unit 27 determines that the configuration information about the protocols to be combined indicate the start point and end point of the same link. FIG. 23 is a diagram illustrating an example of the link information designated as subjects to be combined.

Figure 24:
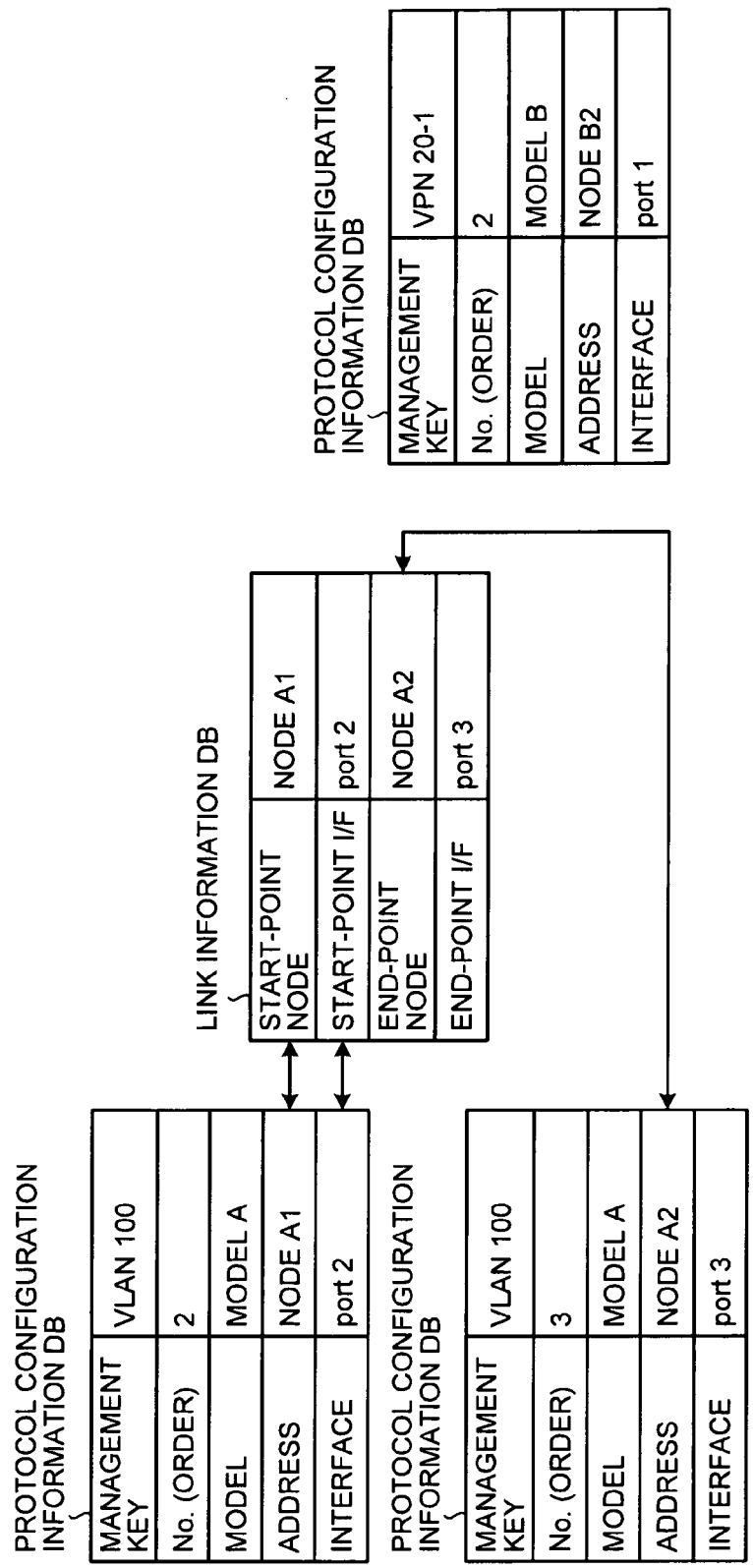
FIG. 24 is a diagram illustrating an example of link information not designated as subjects to be combined.

In the other example, the VLAN configuration information is "management key=VLAN 100, No.=2, model=model A, address=node A1, interface=port 2". The VPN configuration information is "management key=VPN 20-1, No.=2, model=model B, address=node B2, interface=port 1", for example. The link information is stored as "start-point node=node A1, start-point I/F=port 2, end-point node=A2, end-point I/F=port 3", for example. In this case, "address=A1, interface=port 2" of the VLAN configuration information is the start point, but "address=node B2, interface=port 1" of the VPN configuration information is not stored as the end point in the link information DB 22b. Accordingly, in this example, the combined information generating unit 27 determines that the configuration information about the protocols to be combined does not indicate the start point and end point of the same link. FIG. 24 is a diagram illustrating an example of the link information not designated as subjects to be combined.

Referring back to FIG. 18, the combined information generating unit 27 refers to the protocol information storage location settings file that corresponds to the subjects to be combined and is stored in the protocol information storage location settings files 22c, and obtains the contents of an item from the protocol configuration information about the subjects to be combined (step S209). The combined information generating unit 27 then determines whether the obtained item contents are "information that is stored in the protocol management information" (step S210).

If the obtained item contents are "information that is stored in the protocol management information" ("Yes" in step S210), the combined information generating unit 27 obtains the management information designated by the protocol information storage location settings file (step S211). The combined information generating unit 27 further obtains the storage location designated by the protocol information storage location settings file (step S212), and stores the obtained management information into the designated storage location (step S213). After storing all the management information related to the items designated by the protocol information storage location settings file ("Yes" in step S214), the combined information generating unit 27 ends the operation. In a case where all the management information about the items designated by the protocol information storage location settings file has not been stored ("No" in step S214), the combined information generating unit 27 repeats the procedure of step S209 and the procedures following step S209. If the obtained item contents are not "information that is stored in the protocol management information" ("No" in step S210), the combined information generating unit 27 carries out the procedure of step S215.

As to the above described procedures of steps S209 through S214, an example case where the VLAN and the VPN are the subjects to be combined, the subject VLAN management information is (A) of FIG. 6, and the subject VPN management information is (B) of FIG. 6 is described. Since the VLAN and the VPN are the subjects to be combined in this case, the combined information generating unit 27 refers to the protocol information storage location settings file of (E) of FIG. 5. The combined information generating unit 27 then sequentially obtains information, starting from "(1) item" of (E) of FIG. 5. The combined information generating unit 27 first obtains "(1) item=VPN management key". Since this information is stored in the protocol management information DB 22d, the combined information generating unit 27 determines that the item contents obtained in step S210 are "information that is stored in the protocol management information".

The combined information generating unit 27 then obtains "management key=VPN 20-1" as the information corresponding to "(1) item=VPN management key", from the information illustrated in (B) of FIG. 6. The combined information generating unit 27 further identifies the storage location "management key" for "(1) item=VPN management key" from the protocol information storage location settings file. The combined information generating unit 27 then stores "VPN 20-1" into "management key" in the template designated in step S202. After that, the combined information generating unit 27 obtains "(2) item=VPN address". Since this information is stored in the protocol configuration information DB 22e, the combined information generating unit 27 determines that the item contents obtained in step S210 are not "information that is stored in the protocol management information". Therefore, "(2) item=VPN address" will be processed in step S215 and the steps following step S215.

Figure 25:
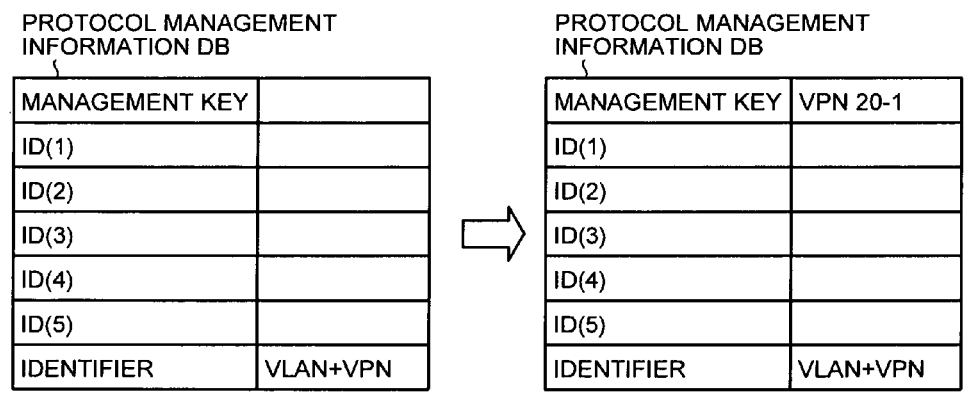
FIG. 25 is a diagram illustrating a state transition of the protocol management information DB of the subjects to be combined.

As a result of the above described procedures, the combined information generating unit 27 can store "management key=VPN 20-1" into the template of the protocol management information "VLAN+VPN" that has not stored information, as illustrated in FIG. 25. FIG. 25 is a diagram illustrating a state transition of the protocol management information DB of the subjects to be combined.

Referring back to step S210 of FIG. 18, the combined information generating unit 27 determines that the obtained item contents are not "information that is stored in the protocol management information" ("No" in step S210). In that case, the combined information generating unit 27 refers to the protocol information storage location settings file corresponding to the subjects to be combined, and obtains the contents of the next item from the protocol configuration information about the subjects to be combined (step S215), as illustrated in FIG. 19. The combined information generating unit 27 then obtains the configuration information designated by the protocol information storage location settings file (step S216), and obtains the storage location designated by the protocol information storage location settings file (step S217).

The combined information generating unit 27 then stores the obtained configuration information into the designated storage location (step S218), and determines whether there is more unchecked, unstored configuration information (step S219). If there is more unchecked, unstored configuration information ("Yes" in step S219), the combined information generating unit 27 carries out the same procedures as those of steps S216 through S218 (steps S220 through S222). If there is no more unchecked, unstored configuration information ("No" in step S219), or if all the configuration information has been stored, the combined information generating unit 27 repeats the procedure of step S214 and the procedures following step S214.

As to the above described procedures of steps S215 through S222, an example case where the subject VLAN configuration information is (A-1) of FIG. 7 and the subject VPN configuration information is (B-1) of FIG. 8 is described. In this case, the combined information generating unit 27 refers to the protocol information storage location settings file of (E) of FIG. 5. The combined information generating unit 27 then sequentially obtains information, starting from "(2) item" of (E) of FIG. 5. The combined information generating unit 27 first obtains "(2) item=VPN address". Since this information is not stored in the protocol management information DB 22d, the combined information generating unit 27 determines that the contents of the item obtained in step S210 are not "information that is stored in the protocol management information".

The combined information generating unit 27 then obtains "address=node B1" as the information corresponding to "(2) item=VPN address", from the information illustrated in (B-1) of FIG. 8. The combined information generating unit 27 further identifies the storage location "configuration: address" for the "(2) item=VPN address" from the protocol information storage location settings file. The combined information generating unit 27 then stores "node B1" into "address" in the protocol configuration information template corresponding to the template designated in step S202.

After that, the combined information generating unit 27 obtains "interface=port 1" as the information corresponding to "(3) item=VPN interface", from the information illustrated in (B-1) of FIG. 8. The combined information generating unit 27 further identifies the storage location "configuration: interface" for "(3) item=VPN interface" from the protocol information storage location settings file. The combined information generating unit 27 then stores "port 1" into "interface" in the protocol configuration information template.

After that, the combined information generating unit 27 obtains "ID(2)=100" as the information corresponding to "(4) item=VLAN management: ID(2)", from the information illustrated in (A) of FIG. 6. The combined information generating unit 27 further identifies the storage location "configuration: ID(1)" for "(4) item=VLAN management: ID(2)" from the protocol information storage location settings file. The combined information generating unit 27 then stores "100" into "ID(1)" in the protocol configuration information template.

Further, the combined information generating unit 27 obtains "ID(1)=1.1.1.1" as the information corresponding to "(5) item=VPN configuration: ID(1)", from the information illustrated in (B-1) of FIG. 8. The combined information generating unit 27 further identifies the storage location "configuration: ID(2)" for "(5) item=VPN configuration: ID(1)" from the protocol information storage location settings file. The combined information generating unit 27 then stores "1.1.1.1" into "ID(2)" in the protocol configuration information template.

Figure 26:
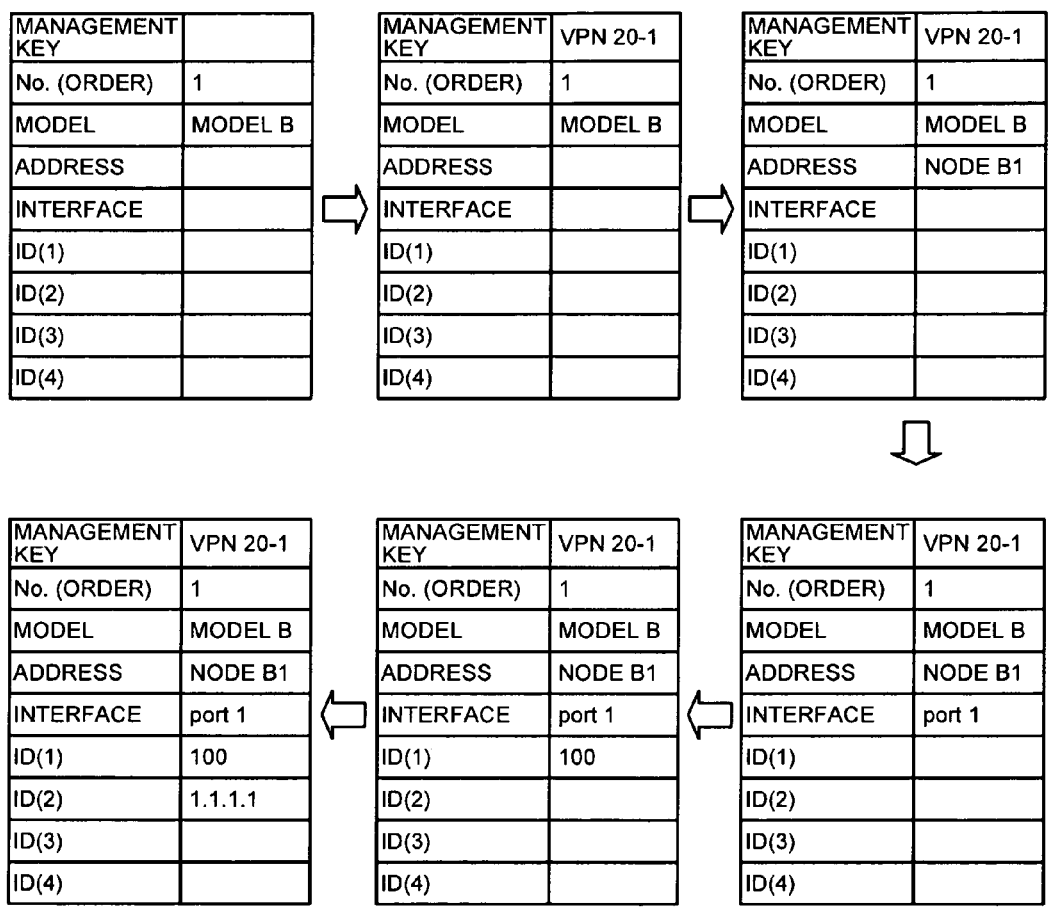
FIG. 26 is a diagram illustrating a state transition of the protocol configuration information DB of the subjects to be combined.

As a result of the above described procedures, the combined information generating unit 27 stores "No.=1" and "model=model B" associated with the protocol management information into the template of the protocol configuration information "VLAN+VPN" that has not stored information, as illustrated in FIG. 26. After that, the combined information generating unit 27 can store "management key=VPN 20-1", and then store "address=node B1", "interface=port 1", "ID (1)=100", and "ID(2)=1.1.1.1" in this order. FIG. 26 is a diagram illustrating state transitions of the protocol configuration information DB of the subjects to be combined.

As described above, by carrying out the procedures of steps S201 through S222, combined information can be generated from the information stored in the common format in the protocol management information DB 22*d* and the protocol configuration information DB 22*e*. The management information and configuration information about the generated combined information can also be generated in the common format, like the other information.

Description of Execution of Provisioning Process

Referring now to FIGS. 27 through 29, execution of the provisioning process corresponding to step S107 of FIG. 13 is described in detail. FIG. 27 is a diagram illustrating an example of execution of a provisioning process for the VLAN. FIG. 28 is a diagram illustrating an example of execution of a provisioning process for the VPN. FIG. 29 is a diagram illustrating an example of execution of a provisioning process for the subjects to be combined (VPN+VLAN).

An example case where the command generating unit 28 determines the provisioning to be performed on the node A1 of the model A that controls the VLAN is described. In this case, as illustrated in FIG. 27, the command generating unit 28 determines the config definition settings file to be (A) of FIG. 12, from "identifier" contained in the protocol management information illustrated in (A) of FIG. 6 and "model" contained in the protocol configuration information illustrated in (A-1) of FIG. 7. The command generating unit 28 then outputs "CMD(1) through CMD(5)" defined by the determined config definition settings file as commands to the Telnet executing unit 29, and the Telnet executing unit 29 executes "CMD(1) through CMD(5)" for the node A1.

An example case where the command generating unit 28 determines the provisioning to be performed on the node B1 of the model B that controls the VPN is described. In this case, as illustrated in FIG. 28, the command generating unit 28 determines the config definition settings file to be (D) of FIG. 12, from "identifier" contained in the protocol management information illustrated in (B) of FIG. 6 and "model" contained in the protocol configuration information illustrated in (B-1) of FIG. 8. The command generating unit 28 then outputs "CMD(1) through CMD(17)" defined by the determined config definition settings file as commands to the Telnet executing unit 29, and the Telnet executing unit 29 executes "CMD(1) through CMD(17)" for the node B1.

An example case where the command generating unit 28 determines the provisioning to be performed on the node B1 of the model B that controls the VLAN+VPN to be combined is described. In this case, as illustrated in FIG. 29, the command generating unit 28 determines the config definition settings file to be (E) of FIG. 12, from "identifier" contained in the protocol management information illustrated in (E) of FIG. 6 and "model" contained in the protocol configuration information illustrated in (E-1) of FIG. 11. The command generating unit 28 then outputs "CMD(1) through CMD(5)" defined by the determined config definition settings file as commands to the Telnet executing unit 29, and the Telnet executing unit 29 executes "CMD(1) through CMD(5)" for the node B1.

Effects of Second Embodiment

As described above, according to the second embodiment, the network management control device 20 can perform provisioning to combine protocols, and there is no need for the manager to manually input commands. Accordingly, provisioning can be automatically performed to combine networks that are controlled by different protocols from one another.

Also, according to the second embodiment, since the network management control device 20 can perform operations including the provisioning for combining protocols, there is no need for the manager to manually input commands, and a stop is not caused during network communications due to an input of a wrong command. Also, since the network management control device 20 can perform operations including the provisioning for combining protocols, there is no need for the manager to have a thorough knowledge of network devices. Accordingly, it is possible to dramatically reduce the costs and time taken for educating managers.

Also, according to the second embodiment, the network management control device 20 can perform operations including the provisioning for combining protocols. As a result, there is no need to examine provisioning commands that are input by the manager. Accordingly, provisioning can be promptly performed, and services can be swiftly provided to customers. It is also possible to spare the manager the trouble of doing the work to combine protocols.

Also, according to the second embodiment, the network management control device 20 can manage the combined information between protocols. Accordingly, when a network failure occurs, it is possible to know how the network is constructed. Also, the information about each protocol and the combined information between protocols are managed in a common format, and provisioning is performed in accordance with definitions. Accordingly, a new protocol or a new combination pattern can be coped with simply by creating definition information. As a result, initial costs can be dramatically lowered, and new services can be provided in response to customers' demands.

Also, according to the second embodiment, the information about each protocol and the combined information between protocols are managed in a common format, and provisioning is performed according to definitions. Accordingly, a new protocol and a new combination pattern can be coped with simply by creating definition information. As a result, the software development period becomes unnecessary, and a network can be built in accordance with the market trend, which leads to a further expansion of business.

[c] Third Embodiment

Embodiments of the present invention have been described so far, but various other embodiments of the present invention can be formed other than the above described ones. The following is a description of other embodiments.

Examples of Protocols

The protocols used in the networks illustrated in the drawings of the first and second embodiments are merely examples, and the present invention is not limited to them. For example, the present invention can be applied to various other protocols such as Session Initiation Protocol (SIP), Interior Gateway Routing Protocol (IGRP), and Open Shortest Path First (OSPF). That is, provisioning can be performed on protocols other than those described in this embodiment, by generating combined information in the same manner as in the first or second embodiment.

Timing of Provisioning

In the second embodiment, the protocol management information DB 22*d* and the protocol configuration information DB 22*e* are stored in a common format that does not depend on protocols, and combined information is then generated to perform provisioning. However, the present invention is not limited to that. For example, combined information can be generated any time, and provisioning can also be generated any time, after the protocol management information DB 22*d* and the protocol configuration information DB 22*e* are stored in a common format that does not depend on protocols.

In a specific example, when a change is made to the settings of an existing node having information already stored therein, and the information about this change to the settings is received, the same operation as that of the second embodiment may be performed on the received information about the change to the settings and the information about the received information. Also, when new combined information is generated, the procedure of step S105 of FIG. 13 and the procedures following step S105 may be carried out.

System Configuration

Among the respective procedures described in this embodiment, all of or part of the procedures that are automatically carried out may be manually carried out. Alternatively, all of or part of the procedures that are manually carried out may be automatically carried out by a known technique. Other than that, arbitrary changes may be made to the sequence of procedures, the sequence of control procedures, and the specific names, such as the information containing various kinds of data and parameters illustrated in FIGS. 3 through 12, FIGS. 14 through 17, and FIGS. 20 through 29, unless otherwise specified.

The components of the respective devices illustrated in the drawings are conceptual in terms of functions, and do not need to physically have the structures illustrated in the drawings. That is, specific embodiments of separations and combinations of the respective devices are not limited to those illustrated in the drawings. For example, the command generating unit 28 and the Telnet executing unit 29 may be integrated. All of or part of the devices can be functionally or physically divided or integrated by arbitrary unit, in accordance with the loads and usage states of the respective devices. Further, all of or part of the respective processing functions carried out by the respective devices may be realized by a CPU and a program that is analyzed and executed by the CPU, or may be realized as hardware formed by wired logics.

Programs

Each of the procedures described in the above embodiments can be realized by a computer system such as a personal computer or a workstation that executes predetermined programs. In view of this, an example of a computer system that executes programs for providing the same functions as those of the above described embodiments is described in the following.

Figure 30:
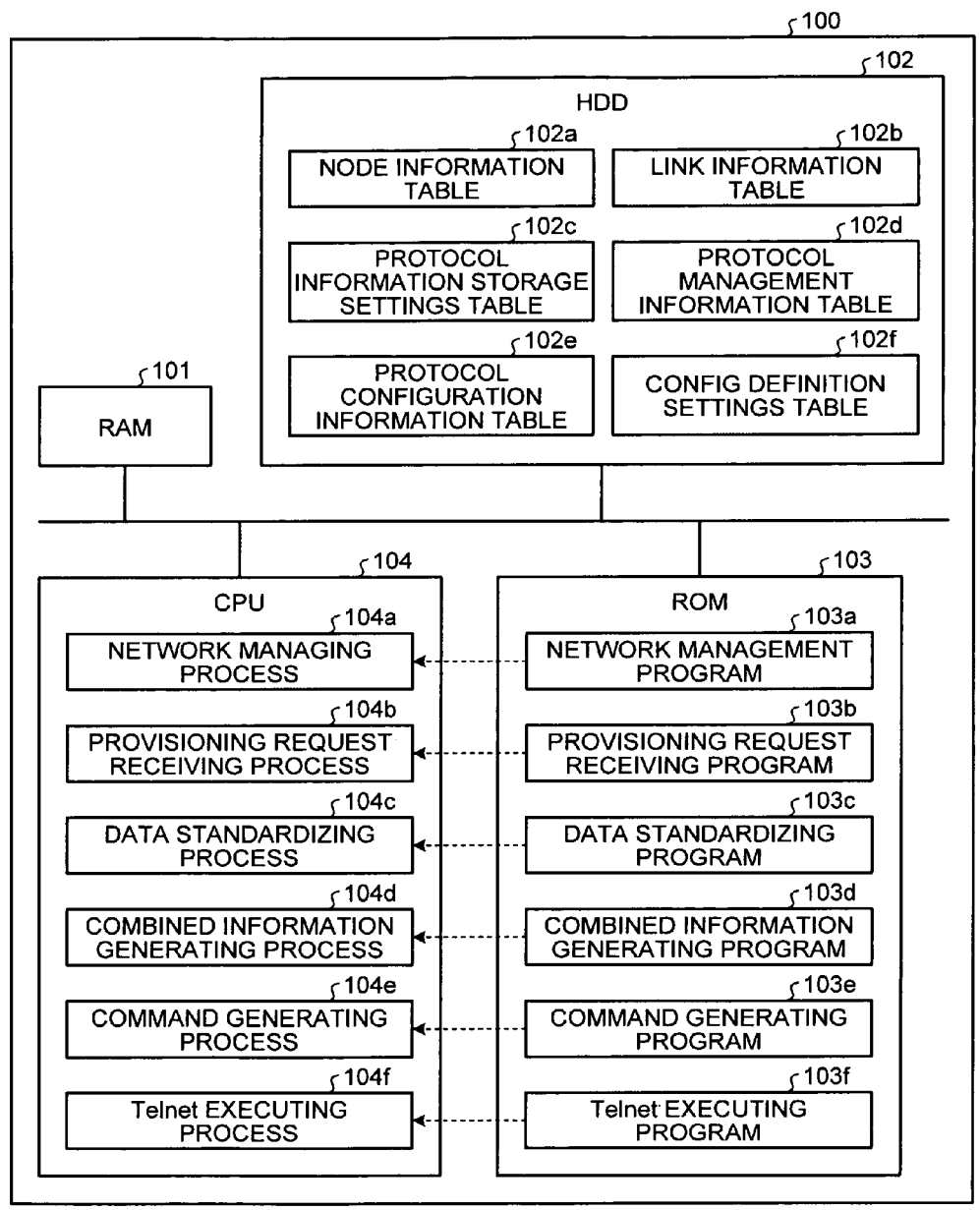
FIG. 30 is a diagram illustrating a computer system that executes a network management control program.

FIG. 30 is a diagram illustrating a computer system that executes a network management control program. As illustrated in FIG. 30, a computer system 100 includes a RAM 101, a HDD 102, a ROM 103, and a CPU 104. Programs that provide the same functions as those of the above described embodiments are stored in the ROM 103 in advance. That is, a network managing program 103*a*, a provisioning request receiving program 103*b*, and a data standardizing program 103*c* are stored in the ROM 103, as illustrated in FIG. 30. Further, a combined information generating program 103*d*, a command generating program 103*e*, and a Telnet executing program 103*f* are stored in the ROM 103 in advance.

Those programs 103*a* through 103*f* are read into the CPU 104, and are executed to realize the respective processes illustrated in FIG. 30. Specifically, the programs 103*a* through 103*f* turn into a network managing process 104*a*, a provisioning request receiving process 104*b*, a data standardizing process 104*c*, a combined information generating process 104*d*, a command generating process 104*e*, and a Telnet executing process 104*f*, respectively.

It may be noted that the network managing process 104*a* is equivalent to the network configuration managing unit 24 illustrated in FIG. 2. Likewise, the provisioning request receiving process 104*b* is equivalent to the provisioning request receiving unit 25. The data standardizing process 104*c* is equivalent to the data standardizing unit 26 illustrated in FIG. 2, and the combined information generating process 104*d* is equivalent to the combined information generating unit 27. The command generating process 104*e* is equivalent to the command generating unit 28 illustrated in FIG. 2, and the Telnet executing process 104*f* is equivalent to the Telnet executing unit 29.

A node information table 102*a*, a link information table 102*b*, and a protocol information storage settings table 102*c* are provided in the HDD 102. Further, a protocol management information table 102*d*, a protocol configuration information table 102*e*, and a config definition settings table 102*f* are provided in the HDD 102. It may be noted that the node information table 102*a* is equivalent to the node information DB 22*a* illustrated in FIG. 2, the link information table 102*b* is equivalent to the link information DB 22*b*, and the protocol information storage settings table 102*c* is equivalent to the protocol information storage location settings files 22*c*. Also, the protocol management information table 102*d* is equivalent to the protocol management information DB 22*d* illustrated in FIG. 2, the protocol configuration information table 102*e* is equivalent to the protocol configuration information DB 22*e*, and the config definition settings table 102*f* is equivalent to the config definition settings files 22*f*.

The above described programs 103*a* through 103*f* are not necessarily stored in the ROM 103. For example, the programs 103a through 103f may be stored in a "portable physical medium" inserted to the computer system 100, such as a flexible disk (FD), a CD-ROM, a MO disk, a DVD disk, a magneto-optical disk, or an IC card. Alternatively, the programs 103a through 103f may be stored in a "stationary physical medium" such as a hard disk drive (HDD) provided inside or outside the computer system 100. Further, the programs 103a through 103f may be stored in "another computer system" connected to the computer system 100 via a public line, the Internet, a LAN, or a WAN. The computer system 100 may read and execute the programs from any of those media.

That is, the programs in these other embodiments are recorded on a recording medium such as the above "portable physical medium", "stationary physical medium", or "communication medium" in a computer-readable manner. The computer system 100 reads the programs from such a recording medium, and executes the programs to realize the same functions as those of the above described embodiments. It may be noted that the programs in these other embodiments are not necessarily executed by the computer system 100. For example, the present invention may be applied to a case where the programs are executed by another computer system or a server or a case where the programs are executed by another computer system and a server cooperating with each other.

According to any one of the embodiments of the network management control program, the network management control device, and the network management control method disclosed herein, automatic provisioning can be performed to combine different protocols.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing therein a program for network management control causing a computer to execute a process comprising:
   first extracting, from a protocol configuration information unit that stores configuration information about each network in a plurality of networks that are controlled by different protocols, a first combination of address information and interface information, the first combination corresponding to a first protocol to be joined;
   second extracting, from the protocol configuration information unit, a second combination of address information and interface information, the second combination corresponding to a second protocol to be joined;
   specifying, by referring to a link information storing unit that stores information about a connection between nodes belonging to the respective networks, a first node and a second node according to the link information in which the first combination and the second combination are associated with each other;
   first generating combined information to join the networks between the different protocols by extracting information from a protocol management information unit that stores protocol management information related to a provisioning which joins the different protocols and the protocol configuration information unit according to a format corresponding to a third combination of the first protocol and the second protocol;
   second generating a command which sets a config to join the networks between the different protocols by storing information extracted from the combined information in a template corresponding to the third combination; and
   performing the provisioning by executing the command on the first node and the second node.

2. The computer-readable, non-transitory medium according to claim 1, wherein
   the first extracting includes extracting the first combination from the protocol configuration information unit that stores the configuration information about each network in a format common to the different protocols, and
   the second extracting includes extracting the second combination from the protocol configuration information unit that stores the configuration information about each network in a format common to the different protocols.

3. The computer-readable, non-transitory medium according to claim 2, wherein the program causes the computer to further execute:
   storing the configuration information into the protocol management information storing unit in accordance with a management location information stored in a location information storing unit that holds management location information indicating a storage location in the protocol management information storage unit in the common format, and storing the configuration information into the protocol configuration information storing unit in accordance with a configuration location information stored in the location information storing unit that holds configuration location information indicating a storage location in the protocol configuration information storage unit in the common format.

4. The computer-readable, non-transitory medium according to claim 1, wherein the second generating includes identifying the template corresponding to the third combination by referring to a command information storing unit that stores a plurality of templates corresponding to protocol to be joined.

5. A network management control method comprising:
   first extracting, from a protocol configuration information unit that stores configuration information about each network in a plurality of networks that are controlled by different protocols, a first combination of address information and interface information, the first combination corresponding to a first protocol to be joined;
   second extracting, from the protocol configuration information unit, a second combination of address information and interface information, the second combination corresponding to a second protocol to be joined;
   specifying, by referring to a link information storing unit that stores information about a connection between nodes belonging to the respective networks, a first node and a second node according to the link information in which the first combination and the second combination are associated with each other;
   first generating combined information to join the networks between the different protocols by extracting information from a protocol management information unit that stores protocol management information related to a provisioning which joins the different protocols and the protocol configuration information unit according to a format corresponding to a third combination of the first protocol and the second protocol;

second generating a command which sets a config to join the networks between the different protocols by storing information extracted from the combined information in a template corresponding to the third combination; and performing the provisioning by executing the command on the first node and the second node.

6. The network management control method according to claim 5, wherein the first extracting includes extracting the first combination from the protocol configuration information unit that stores the configuration information about each network in a format common to the different protocols, and the second extracting includes extracting the second combination from the protocol configuration information unit that stores the configuration information about each network in a format common to the different protocols.

7. The network management control method according to claim 6, further comprising:

storing the configuration information into the protocol management information storing unit in accordance with a management location information stored in a location information storing unit that holds management location information indicating a storage location in the protocol management information storage unit in the common format, and storing the configuration information into the protocol configuration information storing unit in accordance with a configuration location information stored in the location information storing unit that holds configuration location information indicating a storage location in the protocol configuration information storage unit in the common format.

8. The network management control method according to claim 5, wherein the second generating includes identifying the template corresponding to the third combination by referring to a command information storing unit that stores a plurality of templates corresponding to protocol to be joined.

9. A network management control apparatus comprising:
a memory; and
a processor, wherein the processor executes:
first extracting, from the memory that stores configuration information about each network in a plurality of networks that are controlled by different protocols, a first combination of address information and interface information, the first combination corresponding to a first protocol to be joined;

second extracting, from the memory, a second combination of address information and interface information, the second combination corresponding to a second protocol to be joined;

specifying, by referring to the memory that stores information about a connection between nodes belonging to the respective networks, a first node and a second node according to the link information in which the first combination and the second combination are associated with each other;

first generating combined information to join the networks between the different protocols by extracting information from a protocol management information unit that stores protocol management information related to a provisioning which joins the different protocols and the protocol configuration information unit according to a format corresponding to a third combination of the first protocol and the second protocol;

second generating a command which sets a config to join the networks between the different protocols by storing information extracted from the combined information in a template corresponding to the third combination; and performing the provisioning by executing the command on the first node and the second node.

10. The network management control apparatus according to claim 9, wherein the first extracting includes extracting the first combination from the memory that stores the configuration information about each network in a format common to the different protocols, and the second extracting includes extracting the second combination from the memory that stores the configuration information about each network in a format common to the different protocols.

11. The network management control apparatus according to claim 10, further the processor executes:

storing the configuration information into the memory in accordance with a management location information stored in the memory that holds management location information indicating a storage location in the memory in the common format, and storing the configuration information into the memory in accordance with a configuration location information stored in the memory that holds configuration location information indicating a storage location in the memory in the common format.

12. The network management control apparatus according to claim 9, wherein the second generating includes identifying the template corresponding to the third combination by referring to the memory that stores a plurality of templates corresponding to protocol to be joined.

* * * * *